US012111617B2

(12) United States Patent
Denden

(10) Patent No.: US 12,111,617 B2
(45) Date of Patent: Oct. 8, 2024

(54) DRAGGING TYPE RETROGRADE HOROLOGICAL DISPLAY MECHANISM EQUIPPED WITH A DISPLAY DISCONNECTION LEVER

(71) Applicant: Blancpain SA, Le Brassus (CH)

(72) Inventor: Mehdi Denden, Les Rousses (FR)

(73) Assignee: Blancpain SA, Le Brassus (CH)

( * ) Notice: Subject to any disclaimer, the term of this patent is extended or adjusted under 35 U.S.C. 154(b) by 429 days.

(21) Appl. No.: 17/494,159

(22) Filed: Oct. 5, 2021

(65) Prior Publication Data

US 2022/0206436 A1 Jun. 30, 2022

(30) Foreign Application Priority Data

Dec. 24, 2020 (EP) .................................... 20217232

(51) Int. Cl.
*G04B 19/02* (2006.01)
*G04B 19/04* (2006.01)

(52) U.S. Cl.
CPC ............. *G04B 19/02* (2013.01); *G04B 19/04* (2013.01)

(58) Field of Classification Search
None
See application file for complete search history.

(56) References Cited

U.S. PATENT DOCUMENTS

2019/0286056 A1* 9/2019 Reymond ............ G04B 19/268
2021/0181681 A1* 6/2021 Zaugg .............. G04B 19/24306

FOREIGN PATENT DOCUMENTS

CH 704 915 A2 11/2012
CH 711 768 A2 5/2017
CH 714761 A2 9/2019
CN 101178578 A 5/2008
CN 111045313 A 4/2020

(Continued)

OTHER PUBLICATIONS

European Search Report issued May 6, 2021 in European Application 20217232.6, filed on Dec. 24, 2020, 3 pages (with English Translation of Categories of Cited Documents).

(Continued)

*Primary Examiner* — Renee S Luebke
*Assistant Examiner* — Matthew Hwang
(74) *Attorney, Agent, or Firm* — Oblon, McClelland, Maier & Neustadt, L.L.P.

(57) ABSTRACT

A dragging type retrograde horological display mechanism, arranged to successively display first and distinct indications in a retrograde manner, including a display wheel driven by a drive wheel; a pivoting holding element engaged in a toothing of a fixed display wheel; a return element that constrains a display pinion in rotation; a display disconnection lever including an elastic strip; when the retrograde horological display mechanism moves from the display of the last indication to the display of the next first indication, the holding element pivots, whereas the display disconnection lever is locked, such that the elastic strip becomes strained and the holding element is forced to be released from the toothing of the fixed display wheel, thus enabling the stress induced by the return element to relax and return the retrograde horological display mechanism in the retrograde direction in the initial position to display the first indication.

10 Claims, 25 Drawing Sheets

(56) References Cited

FOREIGN PATENT DOCUMENTS

| | | | |
|---|---|---|---|
| CN | 111290233 | A | 8/2020 |
| EP | 1134627 | A1 | 9/2001 |
| JP | 2014-062784 | A | 4/2014 |
| WO | 2006/078080 | A2 | 7/2006 |

OTHER PUBLICATIONS

Chinese Ofice Action Issued in Chinese Patent Application No. 202111607256.5 on Mar. 29, 2024.

* cited by examiner

DRAGGING TYPE RETROGRADE HOROLOGICAL DISPLAY MECHANISM EQUIPPED WITH A DISPLAY DISCONNECTION LEVER

CROSS-REFERENCE TO RELATED APPLICATION

This application claims priority to European Patent Application No. 20217232.6 filed on Dec. 24, 2020, the entire disclosure of which is hereby incorporated herein by reference.

TECHNICAL FIELD OF THE INVENTION

The present invention relates to a dragging type retrograde horological display mechanism equipped with a display disconnection device.

TECHNOLOGICAL BACKGROUND OF THE INVENTION

Retrograde refers to a horological display mechanism which, on reaching an end position, starts again in reverse and returns to its starting point. Among the retrograde horological display mechanisms that are known, mention can particularly be made of retrograde date display mechanisms an example of which is given by a display hand which moves opposite an index featuring the date indications from “1” to “31”. The display hand points successively to each of the date indications “1” to “31” then, when at the end of the month, it reaches the date indication “31”, it is returned in reverse to face the date indication “1”. Then, the display hand starts moving again opposite the date indications from “1” to “31”. In a number of these retrograde date display mechanisms, when the display hand moves from one date indication to the next date indication, it must advance slightly beyond the date indication to which it is to point before being properly positioned opposite this date indication.

Problems can thus arise during the retrograde return of such horological display mechanisms to the starting point thereof. Indeed, when such retrograde horological display mechanisms are of the “dragging” type, this means that when these mechanisms have reached the end position thereof, the retrograde return thereof to the starting point thereof is performed over a period of time that can be several hours. During this time interval, the display hand exceeds the last indication of the index to which it should normally point and therefore gives the owner of the timepiece wherein such a retrograde horological display mechanism is embedded an incorrect indication. This is difficult to accept particularly as timepieces of this type are often of high value and the period of a few hours during which the retrograde horological display mechanism gives an incorrect indication is often perceived by owners as a design defect or as a sign of malfunction of the timepiece.

SUMMARY OF THE INVENTION

The aim of the present invention is that of remedying the problem mentioned above along with others by providing a dragging type retrograde horological display mechanism which continuously displays the correct indication, in particular during the retrograde return thereof from the end position thereof to the initial position thereof.

To this end, the present invention relates to a dragging type retrograde horological display mechanism driven by a movement of a timepiece wherein this retrograde horological display mechanism is embedded, this retrograde horological display mechanism, arranged to successively display at least one first and one last distinct indication in a retrograde manner, comprising:

- a display wheel;
- a display pinion and a fixed display wheel arranged on either side of the display wheel, the display pinion being freely mounted on the display wheel coaxially, and the fixed display wheel being fixedly mounted concentrically with the display wheel and the display pinion and being provided with a toothing;
- a pivoting holding element engaged in the toothing of the fixed display wheel;
- a drive wheel moved by the timepiece movement and which drives the display wheel;
- a return element which tends to constrain the display pinion in rotation;
- a display disconnection lever rigidly connected to the display pinion and coupled in rotation with the display wheel, this display disconnection lever comprising an elastic strip against which the holding element is disposed;
- the holding element and the display disconnection lever being arranged such that, when the retrograde horological display mechanism moves from the display of the last indication to the display of the next first indication, the holding element pivots, whereas the display disconnection lever is locked, such that the elastic strip becomes strained and the holding element is forced to be released from the toothing of the fixed display wheel, thus enabling the stress induced in the retrograde horological display mechanism by the return element to relax and return this retrograde horological display mechanism in the retrograde direction in the initial position thereof wherein it displays the first indication.

Thanks to these features, the present invention provides a dragging type retrograde horological display mechanism which, thanks to the presence of the disconnection device, consistently gives the owner of the timepiece wherein such a mechanism is embedded an accurate indication of the information displayed, especially when this horological display mechanism returns in a retrograde manner from the end position thereof to the initial position thereof. At that time, indeed, unlike the dragging type date display mechanisms of the prior art which, during the period where they are returned in a retrograde manner to the starting point thereof, exceed the last indication of the index to which they should normally point and therefore give the owner of the timepiece an incorrect indication, the dragging type retrograde horological display mechanism according to the invention points consistently accurately to the indication in question, in particular when it is getting ready to return to the starting point thereof. Thus, the owner of a timepiece wherein a retrograde horological display mechanism according to the invention is embedded will at no time have the impression that his timepiece is suffering from a design defect or has a malfunction, which is very positive for the owner’s perception of his timepiece.

According to special embodiments of the invention:

- in the case where the duration separating the at least one first displayed indication from the at least one last displayed indication is fixed, the retrograde horological display mechanism comprises a fixed period limiting element equipped with a single support surface which determines the duration separating the at least one first indication from the at least one last indication;

in the case where the duration which separates the at least one first displayed indication from the at least one last displayed indication is variable, the retrograde horological display mechanism comprises:

a cam arranged to manage at least two durations of different values which separate the at least one first and one last indication and which is driven by one step by the return element each time the retrograde horological display mechanism moves from the last indication to the next first indication, and a mobile feeler-spindle pressing against a profile of the cam, the feeler-spindle also comprising at least one first and one second support surface determining the two durations of different values which separate the at least one first and one last indication;

the feeler-spindle is provided with a following beak by which this feeler-spindle presses against the cam profile;

the holding element is a fingerpiece comprising a first foot and in that the display disconnection lever comprises a second foot, these first and second feet being arranged such that, when the retrograde horological display mechanism moves from the display of the last indication to the display of the next first indication, these first and second feet are facing the support surface, then, while the drive wheel continues to drive the display wheel, the first foot moves away from the support surface, whereas the second foot abuts against the support surface, which prevents the pivoting of the display disconnection lever and causes the tensioning of the elastic strip, whereas the holding element is forced to be released from the toothing of the fixed display wheel, thus enabling the second foot to be released from the support surface in a retrograde manner and the retrograde horological display mechanism to return to the initial position thereof wherein it displays the first indication;

the holding fingerpiece is pressed elastically into the toothing of the fixed display wheel by a jumper borne by the display wheel;

the drive wheel is equipped with an elastic drive fingerpiece by which this drive wheel drives the display wheel;

the return element is a rack which is constrained elastically, whereby the return rack creates the mechanical tension which constrains the display pinion in rotation;

the return rack comprises a second drive fingerpiece via which the return rack drives by one step a starwheel fastened on the cam each time the retrograde horological display mechanism moves from the display of the last indication to the display of the next first indication;

while the retrograde horological display mechanism displays an indication, the second drive fingerpiece, borne by the return rack, is progressively retracted and is gradually positioned behind a given tooth of the starwheel, such that when the retrograde horological display mechanism moves from the display of the last indication to the display of the next first indication, the elastic tension in the retrograde horological display mechanism is suddenly relaxed and the return rack returns to the initial position thereof by pivoting and by driving therewith the drive fingerpiece which moves the starwheel and therefore the cam forward by one step.

BRIEF DESCRIPTION OF THE FIGURES

Further features and advantages of the present invention will emerge more clearly from the following detailed description of an embodiment example of a dragging type retrograde horological display mechanism according to the invention, this example being given purely by way of illustration and not limiting only, with reference to the appended drawing wherein.

DETAILED DESCRIPTION OF AN EMBODIMENT OF THE INVENTION

The present invention is based on the general inventive idea which consists of providing a dragging type retrograde horological display mechanism with a disconnection device which enables this mechanism to continuously provide an accurate indication of the information displayed, in particular during the period of a few hours during which the retrograde return of this horological display mechanism from the end position thereof to the initial position thereof is performed. Indeed, in some conventional dragging type retrograde horological display mechanisms, when the display hand moves from one date indication to the next indication, the hand needs to slightly exceed the indication, for example date, to which it is to point before being properly positioned opposite this date indication. This is bothersome during the few hours of the period during which the display mechanism is in a situation which enables the retrograde return thereof from the end position thereof to the initial position thereof. Indeed, during this period, the display hand gives an incorrect indication, which can lead the owner of the timepiece to believe that the timepiece is suffering from a design defect or indeed is subject to a malfunction, and results in any case in the owner having a poor image of his timepiece.

According to the invention, "direct" direction refers to the direction in which the different components of the retrograde horological display mechanism turn when the latter moves from a displayed indication to the display of the next indication, and "retrograde" direction to the direction wherein the different components of the retrograde horological display mechanism turn when the latter returns in a retrograde manner to the initial position thereof by moving from the last displayed indication to the display of the next first indication.

Figure 1:
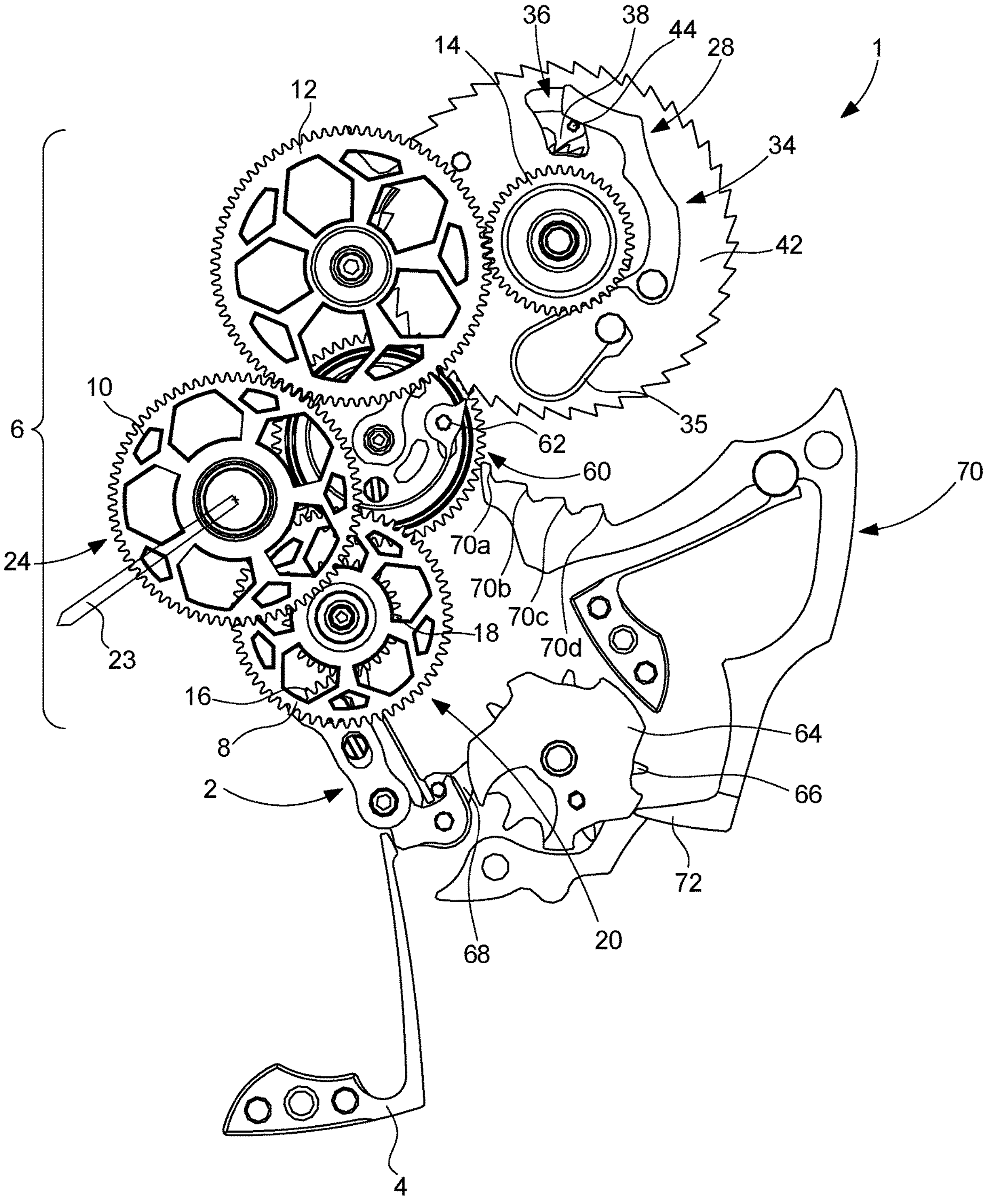
FIG. 1 is a top view of the dragging type retrograde horological display mechanism according to the invention in the situation wherein it is between the first and the last indication displayed.
Figure 2:
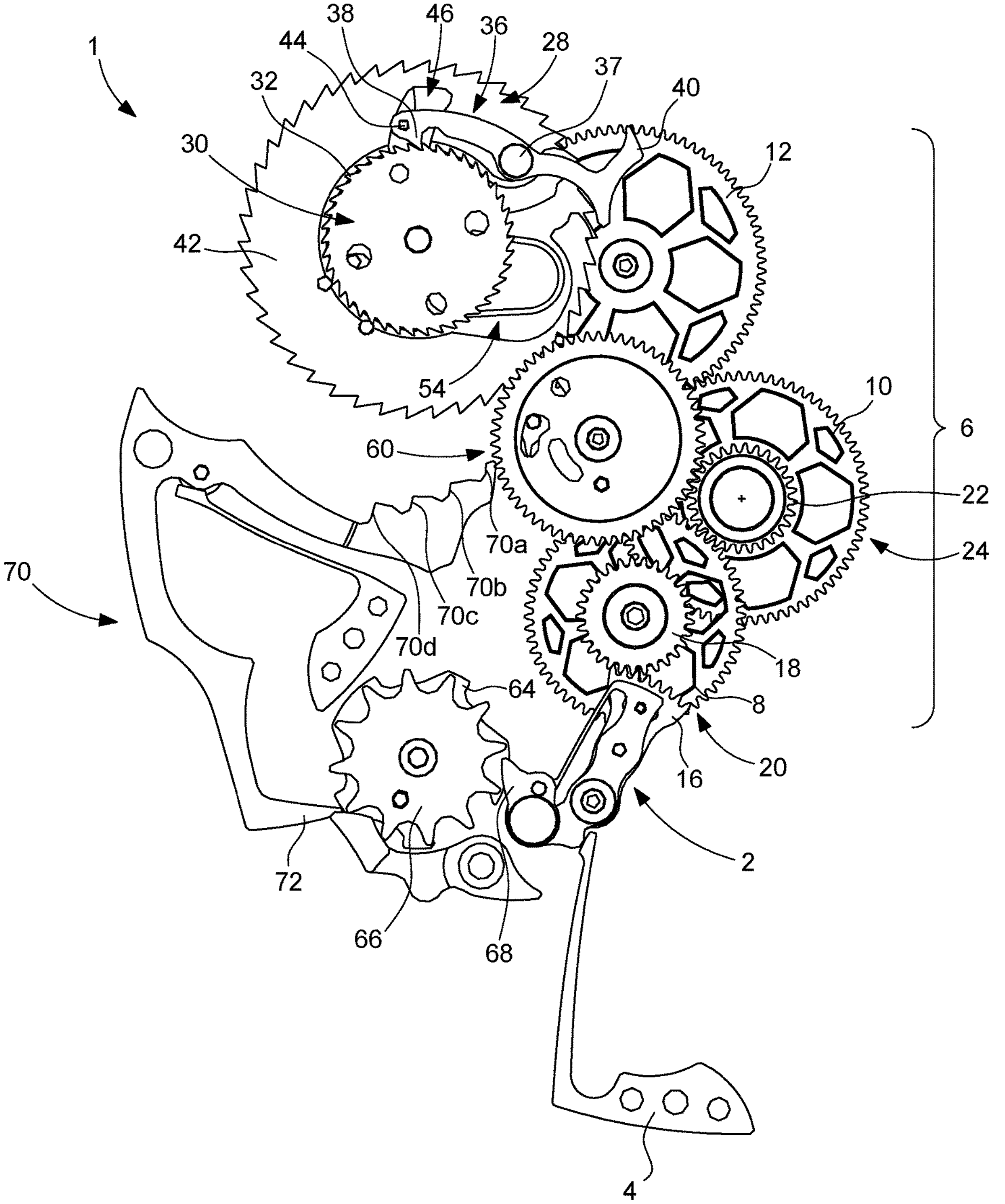
FIG. 2 is a bottom view of the retrograde horological display mechanism according to the invention illustrated in FIG. 1.

Designated as a whole by the general reference number 1, the dragging type retrograde horological display mechanism according to the invention is represented in a top view in FIG. 1 and in a bottom view in FIG. 2. For the purposes of the description of the present invention, it will be assumed that this retrograde horological display mechanism 1 is arranged to display, for example the date indications from "1" to "31". It will be understood nonetheless that this example is given merely by way of illustration and not limiting only, and that this retrograde horological display mechanism may be used to display any type of temporal quantity such as the days of the week, the months of the year or indeed the week numbers.

As seen in FIG. 1, the retrograde horological display mechanism 1 according to the invention comprises a return element such as, non-limitatively, a return rack 2 elastically constrained by a return spring 4. Thanks to the return spring 4 thereof, the return rack 2 creates in a geartrain 6 a mechanical tension which, via a first, a second and a third setting-wheel 8, 10 and 12 respectively, forces a display pinion 14 in rotation in the anti-clockwise direction.

More specifically, it is seen on studying FIG. 2 that the return rack 2 comprises a toothed sector 16 by which it meshes with a first pinion 18 which, with the first setting-wheel 8, forms a first mobile 20. In turn, this first setting-wheel 8 meshes with a second pinion 22 which, with the second setting-wheel 10, forms a second mobile 24. This second setting-wheel 10 in turn meshes with the third setting-wheel 12. Finally, the third setting-wheel 12 meshes with the display pinion 14. Obviously, the number of setting-wheels is given here merely by way of example and may be varied according, in particular, to the size of the retrograde horological display mechanism and the space available in a case of a timepiece (not shown) wherein this retrograde horological display mechanism 1 is embedded.

Figure 4:
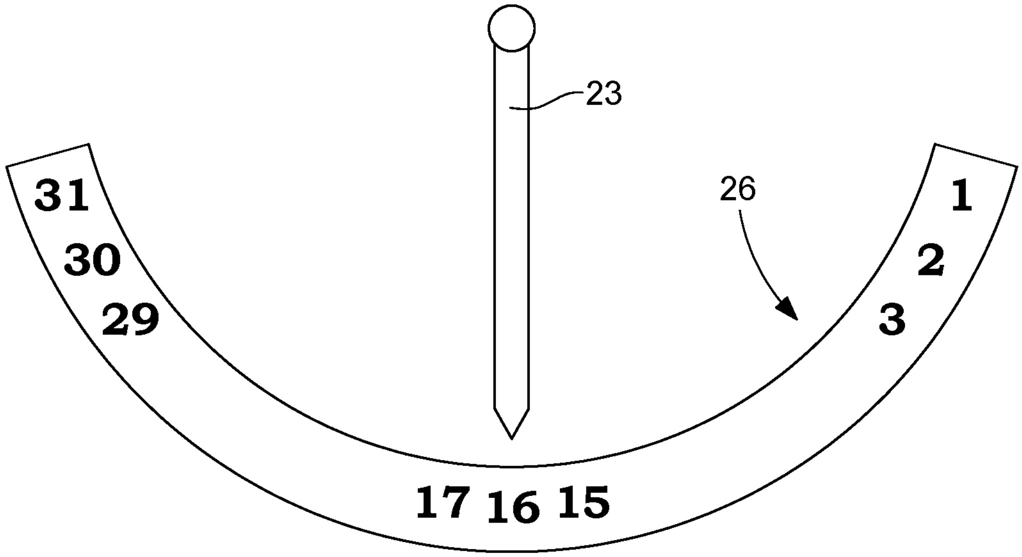
FIG. 4 is a detailed view which illustrates the display hand moving in the clockwise direction in front of an index featuring, for example, the date indications from “1” to “31”

Preferably, a display hand 23 is fastened by any suitable means such as by driving on the second setting-wheel 10. In the situation mentioned above where the retrograde horological display mechanism 1 is used to display date indications, the display hand 23 will move in the clockwise direction opposite an index 26 featuring the date indications from "1" to "31" (see FIG. 4).

The retrograde horological display mechanism 1 is supplemented by a display wheel 28 whereon the display pinion 14 is freely mounted and with which it is coupled coaxially. The retrograde horological display mechanism 1 further comprises a fixed display wheel 30 provided with a toothing 32 preferably of the wolf teeth type. This fixed display wheel 30 is fixedly mounted on a bridge or a plate of the timepiece movement (not shown) concentrically with the pinion 14 and with the display wheel 28.

Figure 9:
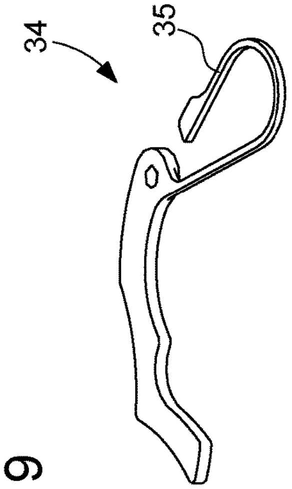
FIG. 9 represents a perspective view of the jumper.
Figure 10:
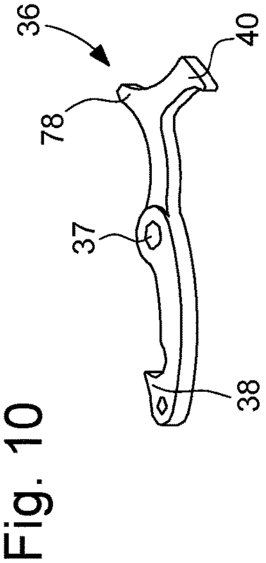
FIG. 10 is a perspective view of the holding fingerpiece.

A jumper 34 provided with an elastic strip 35 is particularly illustrated in FIG. 9. This jumper 34 is borne by the display wheel 28 and presses a holding element preferably such as a holding fingerpiece 36 into the toothing 32 of the fixed display wheel 30. This holding fingerpiece 36, borne by the display wheel 28, is pivotally mounted about a pivot axis 37 and is equipped with a beak 38 by which it is engaged in the toothing 32 of the fixed display wheel 30. Therefore, it is this holding fingerpiece 36 which continuously holds the retrograde horological display mechanism 1 under the tension produced by the return spring 4. This holding fingerpiece 36 also comprises (see FIG. 10) a first foot 40 whose role will be detailed hereinafter. In other words, viewed from above, the toothing 32 makes it possible to retain the elastic tension in the anti-clockwise direction and enables the display wheel 28 to move forward by one step in the clockwise direction when moving from one date indication to the next date indication.

Figure 12:
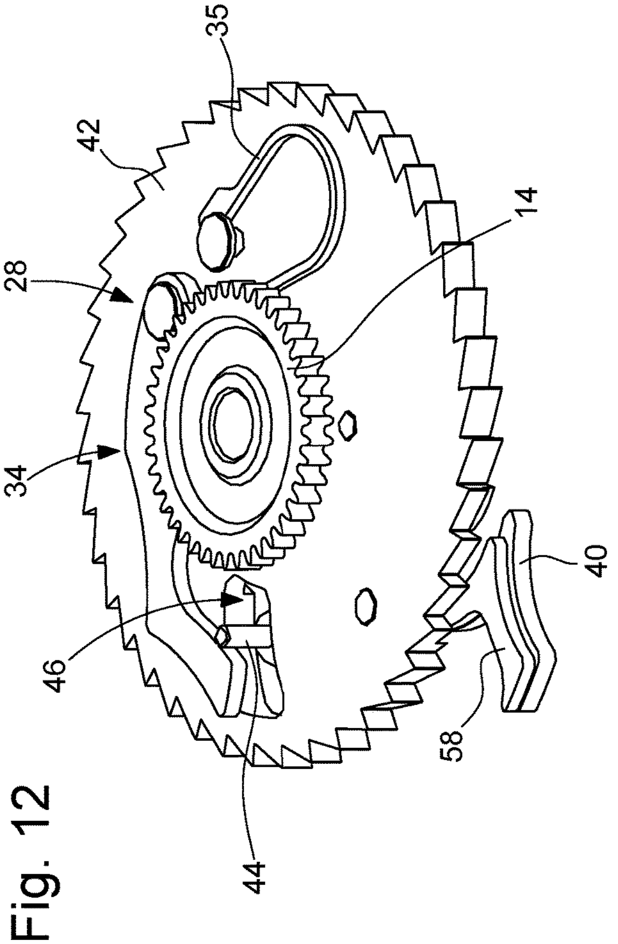
FIG. 12 is a top view of the assembled display wheel.
Figure 13:
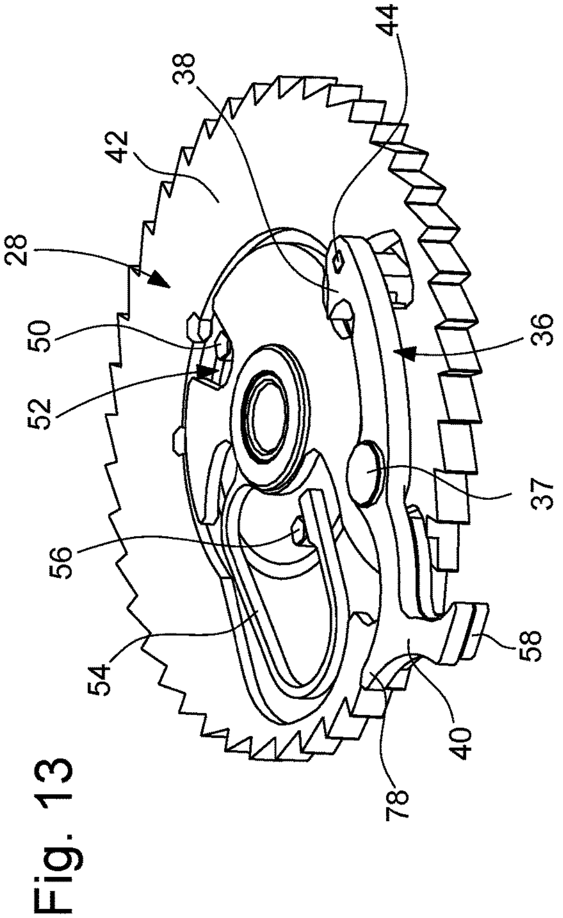
FIG. 13 is a bottom view of the assembled display wheel.

The jumper 34 and the holding fingerpiece 36 are arranged on either side of a plate 42 of the display wheel 28. The jumper 34 acts upon the holding fingerpiece 36 for example via a first pin 44 borne by the holding fingerpiece 36 and which protrudes through an opening 46 provided in the plate 42 of the display wheel 28 (see FIG. 12).

Given that, in the preferred embodiment of the invention, the teeth of the toothing 32 have an inclined wolf teeth profile to enable the holding fingerpiece 36 to move from a space between two wolf teeth to the next space, the retrograde horological display mechanism 1 must enable this holding fingerpiece 36 to go slightly beyond the space between the two wolf teeth in which it is to fall before being able to subsequently return slightly to the rear and fall in this space. For this reason, when moving from one date indication to the next date indication, the display hand 23 somewhat exceeds the date indication to which it is to point before being properly positioned opposite this date indication. During a current month, this does not pose particular problems as the movement made by the display hand 23 beyond the date indication to which it is to point is brief and almost imperceptible by the owner of the timepiece. This overstepping is on the other hand more problematic when moving from the last day of a current month to the first day of the next month. Indeed, as it consists of a dragging type retrograde horological display mechanism 1, the period during which the retrograde horological display mechanism 1 is in a situation which enables the retrograde return thereof from the end position thereof (date indication “28”, “29”, “30” or “31”) to the initial position thereof (date indication “1”) lasts a few hours. Consequently, during this period, the display hand 23 gives an incorrect indication, which can lead the owner of the timepiece to believe that the timepiece is suffering from a design defect or indeed is subject to a malfunction, and results in any case in the owner having a poor image of his timepiece. To remedy this problem, the present invention provides for equipping the retrograde horological display mechanism with a disconnection device which will now be described.

Figure 3:
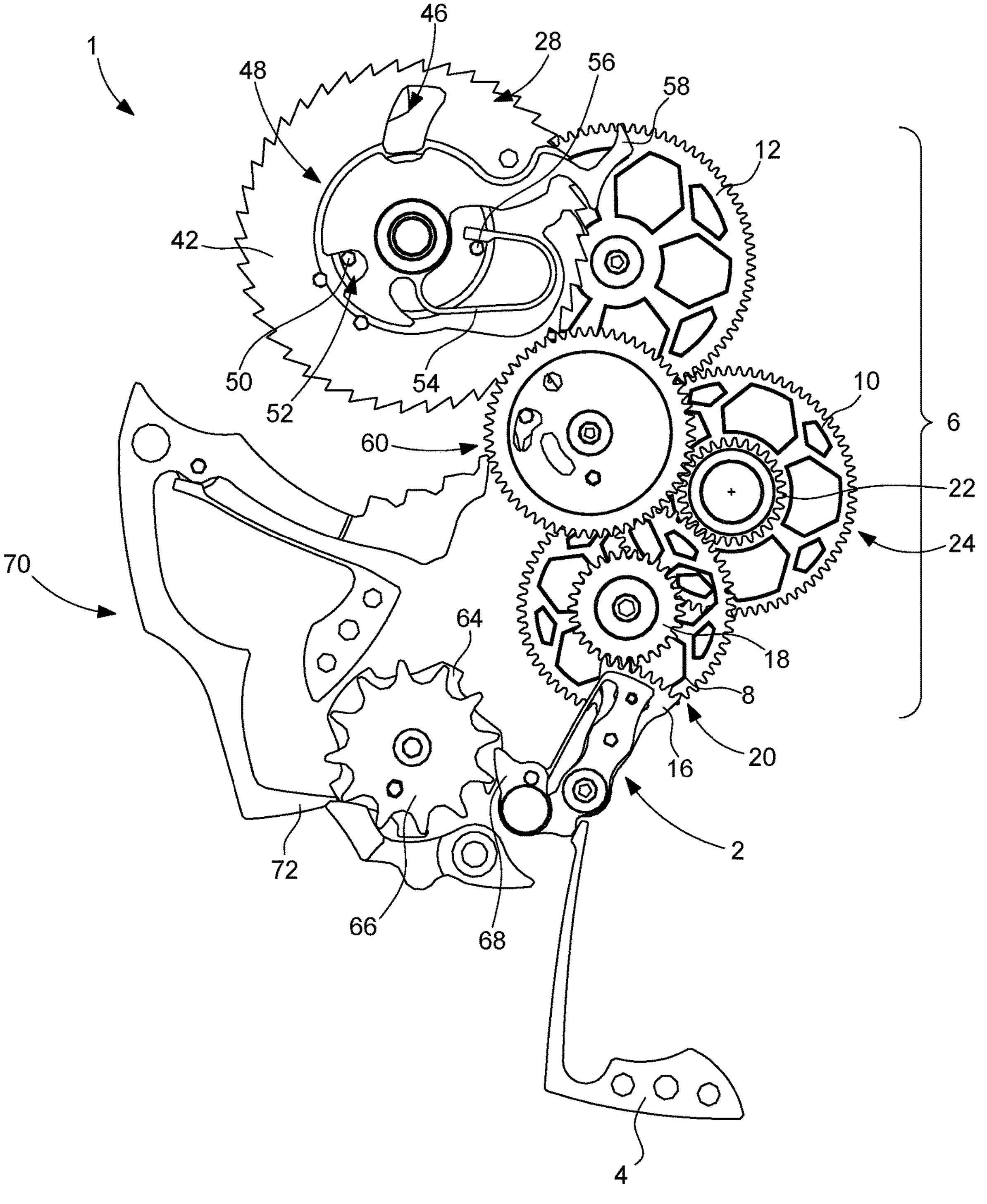
FIG. 3 is a similar view to that of FIG. 2 wherein the fixed display wheel has been removed.
Figure 11:
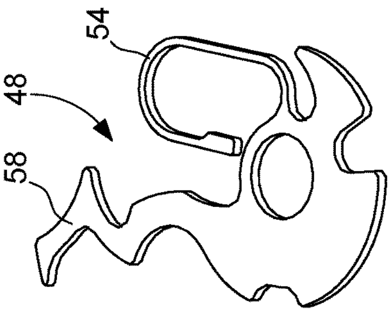
FIG. 11 illustrates a perspective view of the display disconnection lever.

Referring more particularly to FIG. 3 which is a bottom view of the retrograde horological display mechanism 1 from which the fixed display wheel 30 has been removed, it is seen that the disconnection device firstly comprises a display disconnection lever 48 which is rigidly connected to the display pinion 14, for example by driving. Moreover, the display disconnection lever 48 is coupled in rotation with the display wheel 28 by means of a second pin 50 fastened in the plate 42 of this display wheel 28. As seen particularly in FIG. 11, the display disconnection lever 48 also comprises an elastic strip 54 in elastic support against a third pin 56 fastened in the plate 42 of the display wheel 28. The second pin 50 protrudes into an opening 52 provided in the display disconnection lever 48. Finally, the display disconnection lever 48 comprises a second foot 58 the role whereof will be detailed in the following description.

Once per day, some time before midnight (typically of the order of an hour to an hour and a half before the day changes), the retrograde horological display mechanism 1 starts to move from one date indication to the next date indication. For this driving to be possible, it is seen in FIG. 1 that a drive wheel 60, driven in a manner known per se by the timepiece movement at a rate of one full revolution in twenty-four hours, drives therewith a drive finger 62 which, in turn, drives the display wheel 28 one step in the clockwise direction. During this driving, the holding finger 36 moves from a space between two successive teeth of the wolf teeth toothing 32 of the fixed display mechanism 30 to the immediately next space, thus ensuring the maintenance under elastic tension of the overall retrograde horological display mechanism 1. Advantageously, the drive finger 62 is elastic, such that it can move away in front of the teeth of the display wheel 28 when the latter turns in the retrograde direction when the retrograde horological display mechanism 1 returns to the initial position thereof. A further advantage offered by the drive finger 62 is that, due to the elasticity thereof, it enables the owner of the timepiece to perform hand-setting in the anti-clockwise direction without the retrograde horological display mechanism 1 being driven and therefore put out of order.

The display disconnection lever 48 is rigidly connected to the display pinion 14 and, via the second pin 50, is coupled in rotation with the display wheel 28 which is free in rotation relative to the fixed display wheel 30. Consequently, the display pinion 14 which is freely mounted coaxially on the display wheel 28 pivots in turn and, via the third setting-wheel 12, drives the second setting-wheel 10 on which the display hand 23 has been fastened, such that the display can move from one indication to the next indication. Similarly, the third pin 56 comes into contact with the elastic strip 54 of the display disconnection lever 48 and drives the latter in rotation.

According to the preferred embodiment of the retrograde horological display mechanism 1 according to the invention described here, the drive finger 62 drives the display wheel 28 and therefore the holding finger 36 which is borne by the display wheel 28 over 11.1°, while the angle which separates two consecutive teeth of the wolf teeth toothing 32 of the fixed display wheel 30 is merely 8.57°. It is therefore understood that the holding finger 36 moves forward more than necessary, in order to ensure that it moves correctly from a space between two consecutive teeth of the wolf teeth toothing 32 to the immediately next space, and therefore that the information displayed is incremented correctly. It should nonetheless be understood that this embodiment must not be interpreted in a restrictive manner particularly with respect to the angle values which are dependent on the dimensioning of the retrograde horological display mechanism 1.

It is also understood that the example of the display of the date indications from “1” to “31” is also given merely by way of illustration and not mere restriction, and that other time indications can be displayed by the retrograde horological display mechanism 1 according to the invention, such that the rotational speed of the drive wheel 60 can be different from twenty-four hours. For example, the drive wheel 60 will perform a full revolution in seven days if the retrograde horological display mechanism 1 according to the invention is used to display the week. Or the drive wheel 60 will perform a full revolution in 31 days if the display mechanism according to the invention is intended to display the months of the year.

The retrograde horological display mechanism 1 according to the invention described here is of the perpetual date type. To this end, this mechanism comprises a cam 64 on which is fastened a starwheel 66 with twelve teeth which is driven by a second drive finger 68. This second drive finger 68 is borne by the return rack 2 provided with the toothed sector 16 thereof engaged with the display pinion 14 and therefore with the timepiece movement via the first and second mobiles 20 and 24 and the third setting-wheel 12. As it can be understood on studying FIG. 1, driven by the display pinion 14, the return rack 2 pivots by one degree per day in the clockwise direction. During this movement, the second drive finger 68 is progressively retracted and is gradually positioned behind a given tooth of the starwheel 66. When the end of the month is reached and the retrograde horological display mechanism 1 moves from the last date indication "31" of the month in question to the first date indication "1" of the next month, the elastic tension in the retrograde horological display mechanism 1 is suddenly relaxed. At that time, the return rack 2 returns to the initial position thereof by pivoting in the anti-clockwise direction (see FIG. 1) and by driving therewith the second drive finger 68 which moves the starwheel 66 and therefore the cam 64 forward by one step in the clockwise direction.

The retrograde horological display mechanism 1 is finally supplemented by a feeler-spindle 70 which is provided with four successive support surfaces 70*a*, 70*b*, 70*c* and 70*d* which each correspond to a different duration for months with 28, 29, 30 and 31 days. More specifically, the first support surface 70*a* located at the outermost end of the feeler-spindle 70 corresponds to months with 31 days. The immediately next second support surface 70*b* corresponds to months of 30 days and the third and fourth support surfaces 70*c* and 70*d* which follow correspond to the month of February depending on whether it has 29 days (leap years) or 28 days.

Figure 5C:
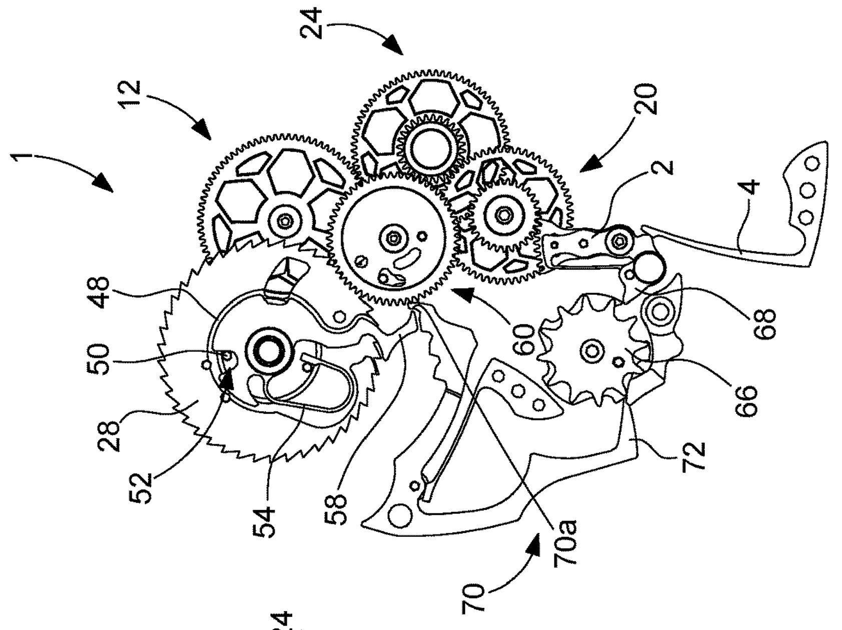
FIGS. 5A, 5B and 5C illustrate, respectively in a top view and in a bottom view with presence of the fixed display wheel and with the fixed display wheel omitted, the situation of the retrograde horological display mechanism where the holding fingerpiece and the display disconnection lever come into contact with the feeler-spindle.
Figure 5B:
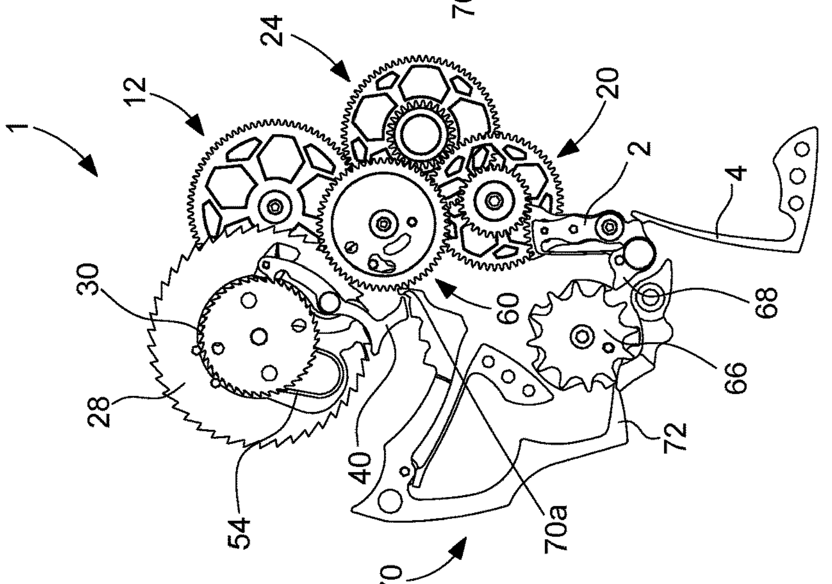
Figure 5A:
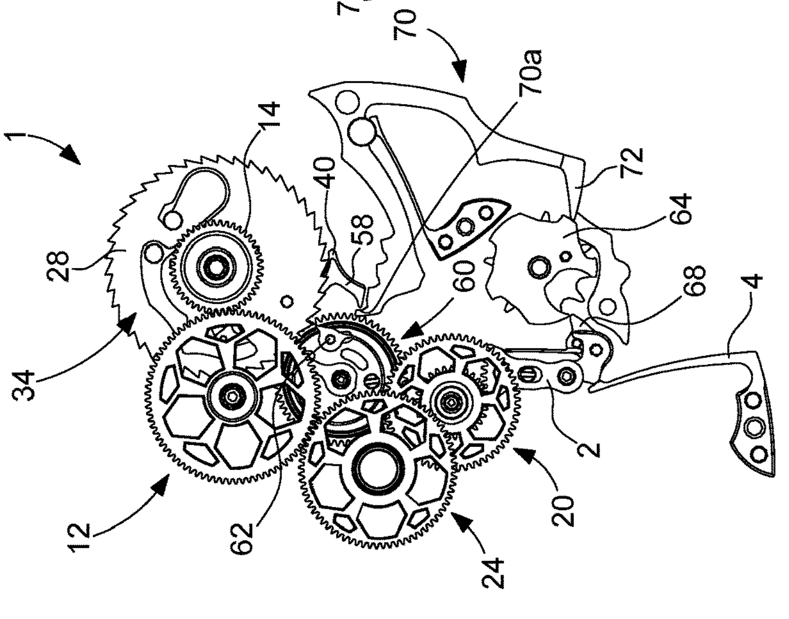
Figures 6A, 6B, 6C:
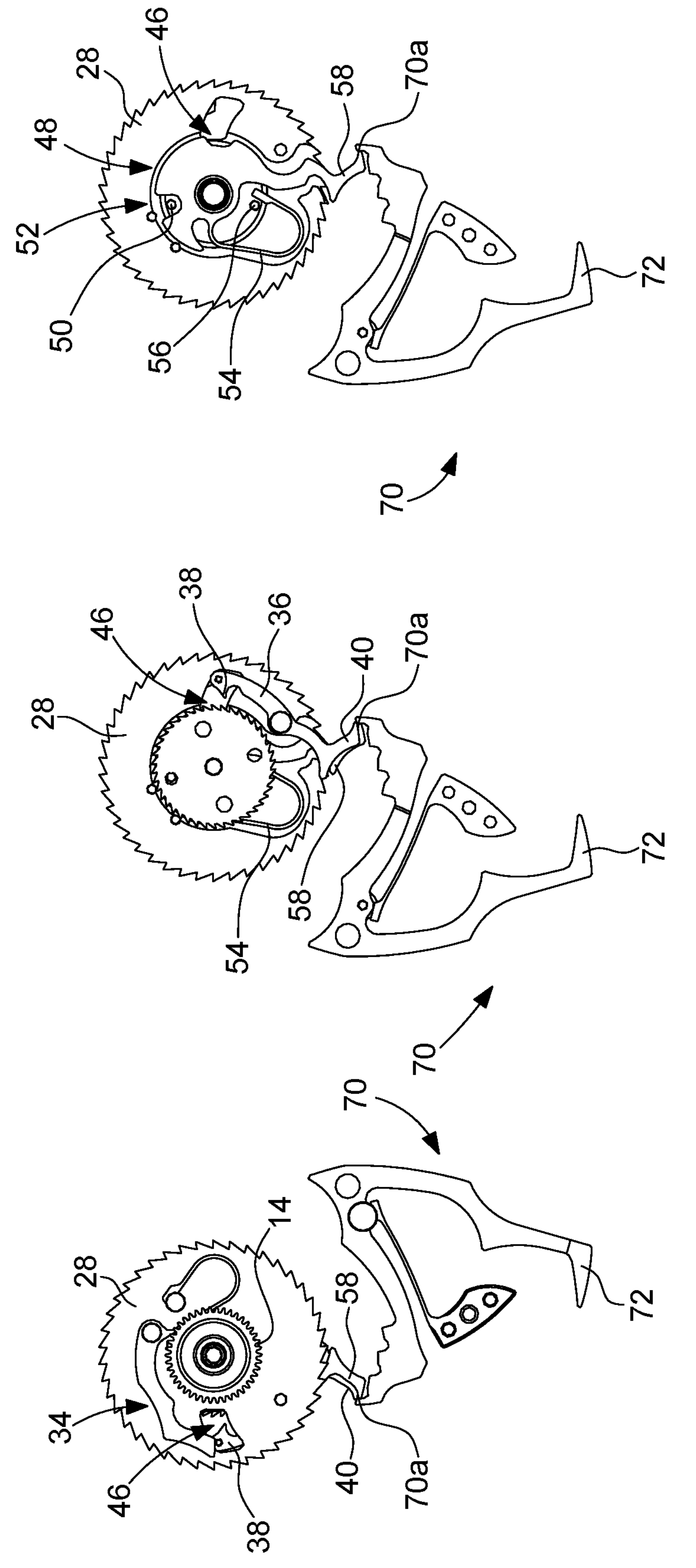
FIGS. 6A, 6B and 6C illustrate, respectively in a top view and in a bottom view with presence of the fixed display wheel and with the display wheel omitted, the situation of the retrograde horological display mechanism when the display disconnection lever is tensioned to allow the holding fingerpiece to move forward and be released from the engagement thereof with the fixed display wheel counter to the elastic force of the jumper.

The feeler-spindle 70 presses against the profile of the cam 64 with a following beak 72. In the example illustrated in the figures appended to the present patent application, the retrograde horological display mechanism 1 according to the invention is in a situation corresponding to the display of the date indications of a month with 31 days. Thus, as seen in FIGS. 5A-5C, when the retrograde horological display mechanism 1 displays the date indication "31" of the month in question and is getting ready to move to the date indication "1" of the next month, the holding finger 36 and the display disconnection lever 48 are facing the first support surface 70*a* of the feeler-spindle 70 via the respective feet 40 and 58 thereof. In this position, the retrograde horological display mechanism 1 is not yet disconnected. Indeed, during the time period which separates the transition of the display from the date indication "31" to the date indication "1", the drive finger 62 is engaged with the display wheel 28 and pivots the latter. While pivoting, this display wheel 28 drives therewith by the second pin 50 the display disconnection lever 48 which, in turn, drives the display pinion 14. At the same time (FIGS. 6A-6C), the display disconnection lever 48 abuts by the foot 58 thereof against the support surface 70*a* of the feeler-spindle 70 and remains locked. As for the holding finger 36, it abuts by the foot 40 thereof against the same support surface 70*a* of the feeler-spindle 70, which forces this holding finger 36 to pivot about its pivoting axis 37 thereof. While pivoting, the holding finger 36 will thus go against the elastic force of the jumper 34 and will be capable of being released from the wolf teeth toothing 32 of the fixed display wheel 30. The display disconnection lever 48 being locked, the elastic strip 54 is, under the effect of the pivoting of the display wheel 28, driven by the third pin 56 and is tensioned. Finally, when the holding finger 36 is released from the wolf teeth toothing 32 of the fixed display wheel 30, the holding force exerted by the elastic strip 54 of the display disconnection lever 48 is released.

The display of the date indication is linked with the display disconnection lever 48; indeed, the drive wheel 60 drives the display wheel 28 which in turn drives the display disconnection lever 48. This display disconnection lever 48, driven on the display pinion 14, induces the pivoting thereof. Consequently, as the display disconnection lever w48 is immobile during the period corresponding to the transition from the end of one month to the start of the next month, the date indication will not change during this period. When the drive finger 62 has finished driving the display wheel 28 and is released therefrom, the retaining force exerted by the elastic strip 54 of the display disconnection lever 48 is relaxed and the display wheel 28 will turn instantaneously in the anti-clockwise direction under the effect of the elastic force of the return spring 4 which is applied to this display wheel 28 via the display disconnection lever 48, the display pinion 14 and the geartrain 6.

Figure 7C:
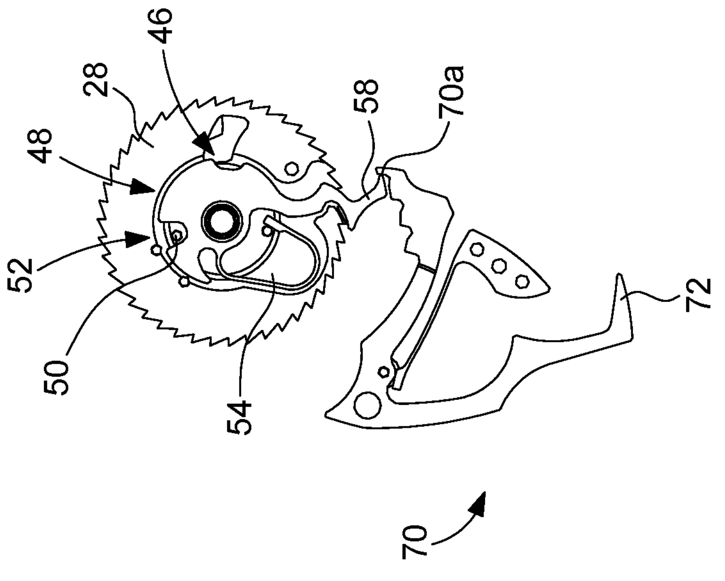
FIGS. 7A, 7B and 7C illustrate, respectively in a top view and in a bottom view with presence of the fixed display wheel and with the display wheel omitted, the situation of the retrograde horological display mechanism when the display is getting ready to move from the last displayed indication to the display of the next first indication.
Figure 7B:
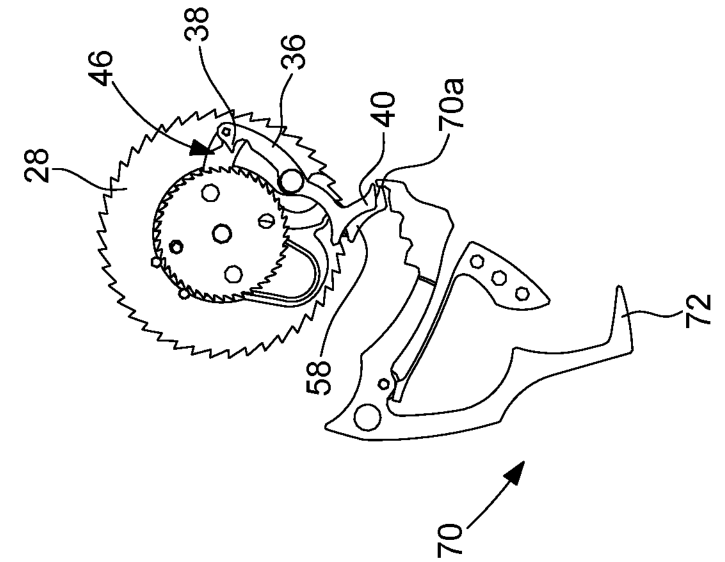
Figure 7A:
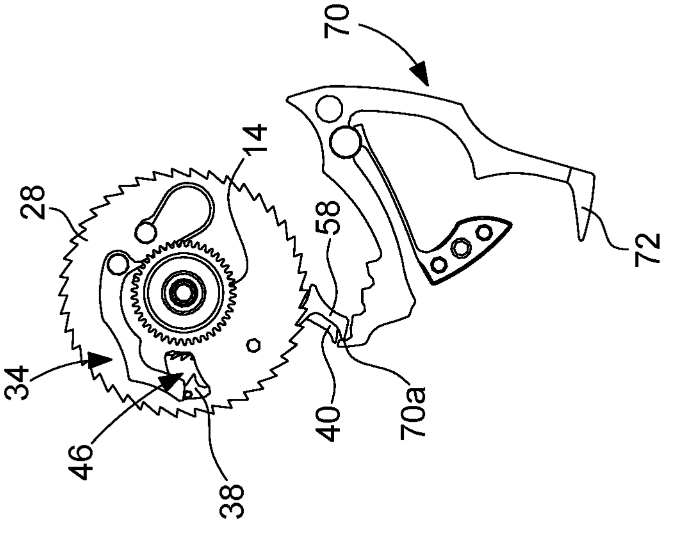

When the display wheel 28 stops turning, a repositioning cam 74 or a pin (not shown) will return the holding finger 36 engaged in the wolf teeth toothing 32 of the fixed display wheel 30. The retrograde horological display mechanism 1 is then in the position illustrated in FIGS. 7A-7C wherein it displays the date indication "1" of the next month.

In normal operating mode of the retrograde horological display mechanism 1, the beak 38 of the holding finger 36 is constantly engaged with the teeth of the wolf teeth toothing 32, except when at around midnight, this retrograde horological display mechanism 1 moves from one date indication to the next date indication and the holding finger 36 pivots just by the amount required to enable the beak 38 thereof to move from a space between two teeth of the wolf teeth toothing 32 to the immediately next space. When the retrograde horological display mechanism 1 reaches the last day of the current month and will have to return in a retrograde manner to the first day of the next month, the foot 40 of the holding finger 36 moves away from the support surface 70*a* of the feeler-spindle 70, such that the holding finger 36 tilts and the beak 38 thereof is released from the engagement thereof with the wolf teeth toothing 32. At that time, the holding in position of the retrograde horological display mechanism 1 is no longer guaranteed and this mechanism will seek to return in a retrograde manner to the date indication "1" which marks the start of a new month, then the beak 38 of the holding fingerpiece 36 will return again to engage in the teeth of the wolf teeth toothing 32, which will ensure again the holding in position of the retrograde horological display mechanism 1.

Figure 8A:
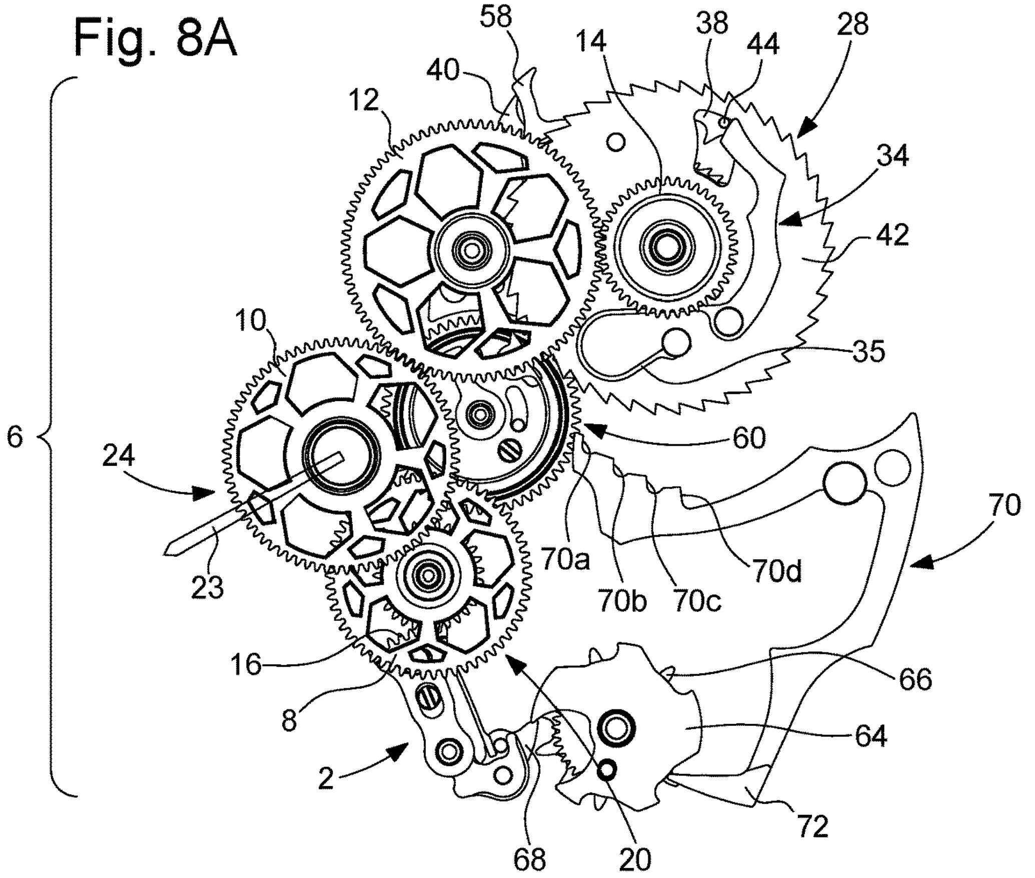
FIGS. 8A, 8C and 8E on one hand, and FIGS. 8B, 8D and 8F on the other, illustrate, respectively in a top view and in a bottom view, the situation of the retrograde horological display mechanism when it moves from the last displayed indication to the display of the next first indication.
Figure 8B:
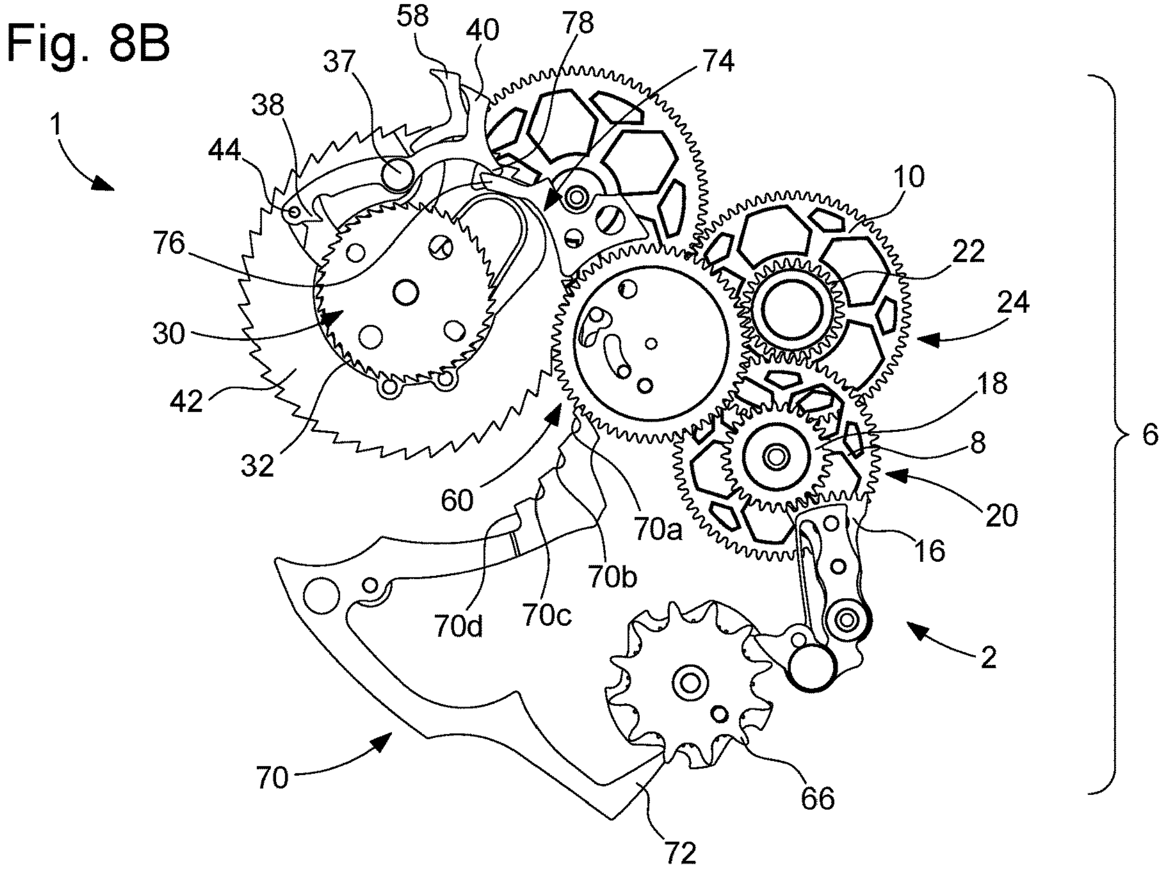
Figure 8C:
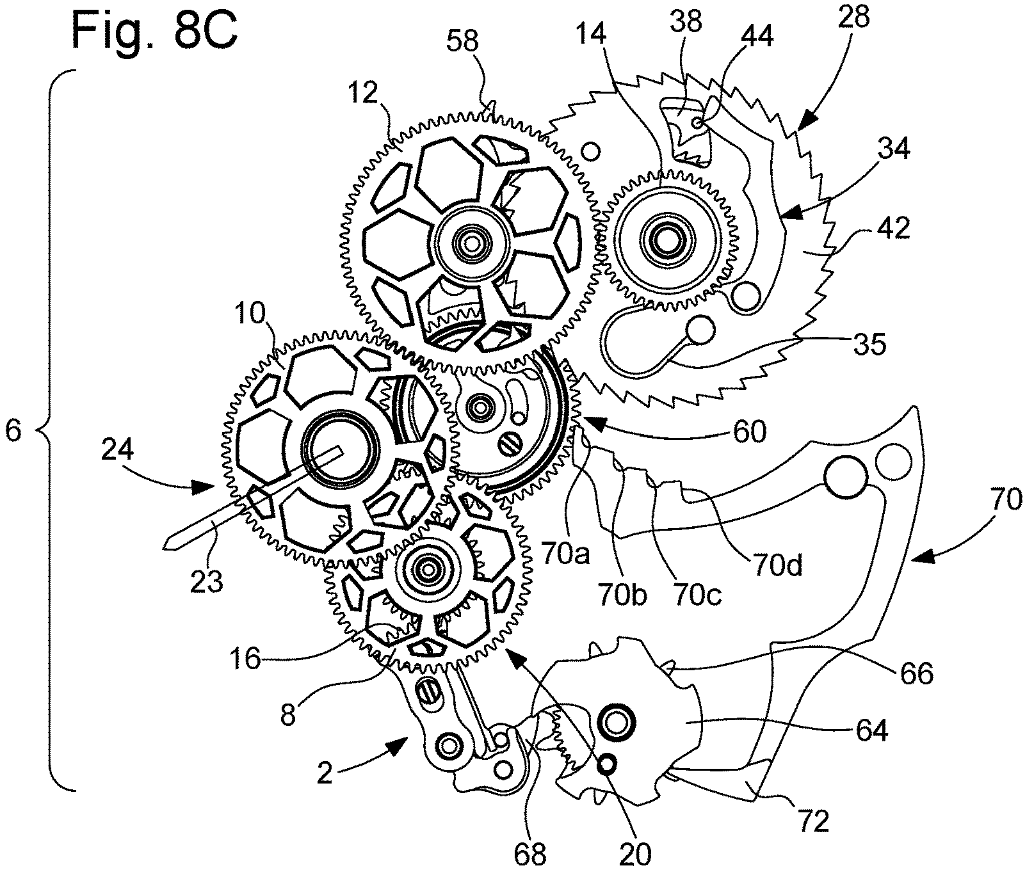
Figure 8D:
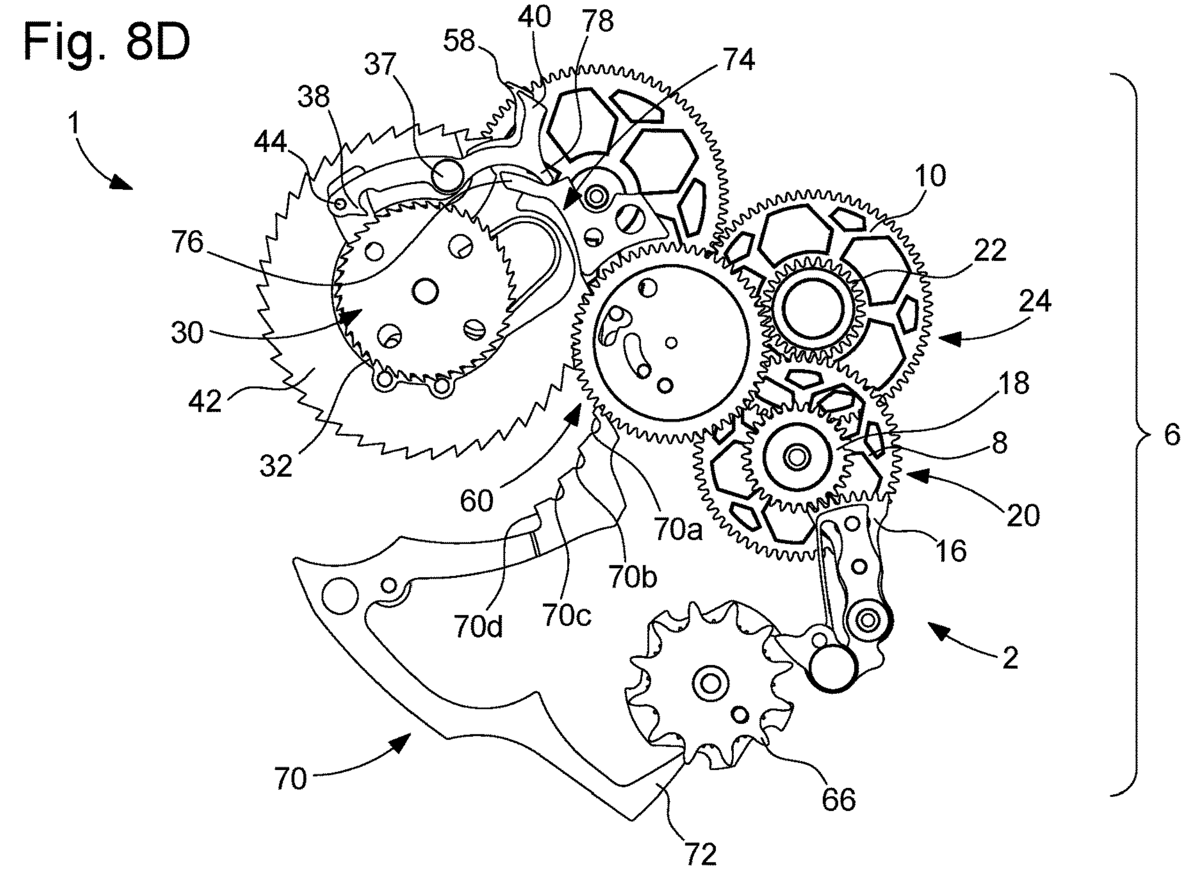
Figure 8E:
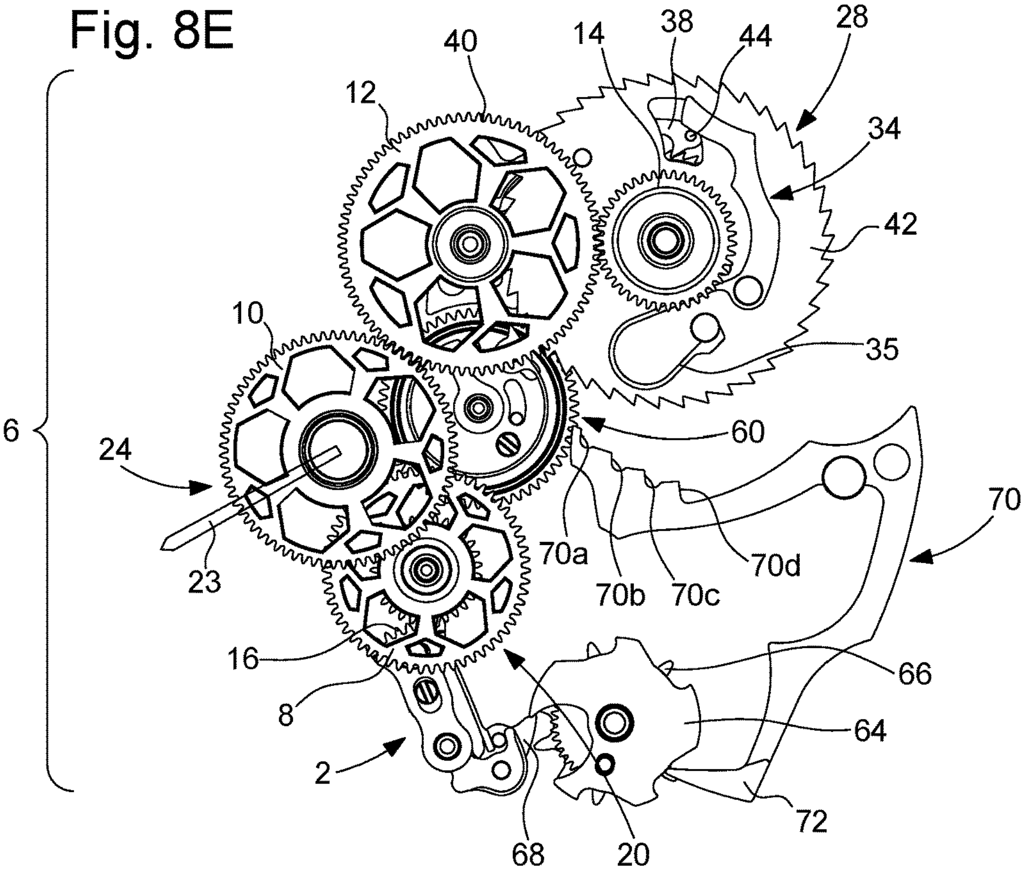
Figure 8F:
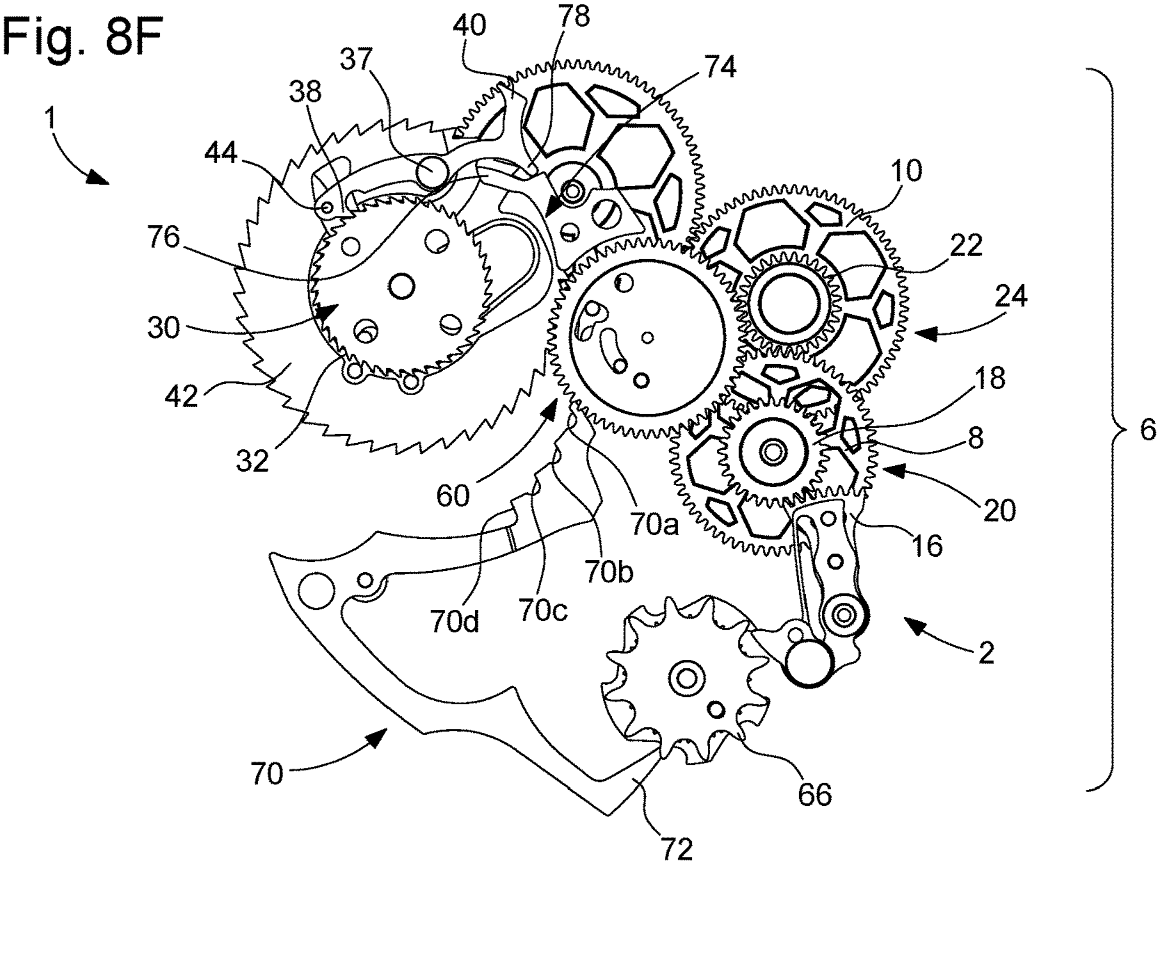

More specifically, FIGS. 8A to 8E illustrate the operation of the retrograde horological display mechanism 1 at the exact time when the latter moves from the last date indication of one month to the first date indication of the next month. In these FIGS. 8A to 8E, the presence is observed of the part called a repositioning cam 74 the role whereof consists, during the return of the retrograde horological display mechanism 1 to the date indication "1" of the next month, of bringing the beak 38 of the holding finger 36 to engage in the wolf teeth toothing 32. For this purpose, this repositioning cam 74, fixedly mounted on a bridge or a plate of the timepiece movement, is provided with a nose 76 against which a counterpart appendage 78 provided on the holding finger 36 will slide. During the return of the retrograde horological display mechanism 1 to the initial position thereof, the display wheel 28 turns, in the top views 8A, 8C and 8E, in the anti-clockwise direction, driving therewith the holding finger 36 which pivots about the pivoting axis 37 thereof and the counterpart appendage 78 whereof slides along the fixed nose 76 of the repositioning cam 74 as seen clearly from FIGS. 8B, 8D and 8F. The profile of this nose 76 is arranged such that when the retrograde horological display mechanism 1 has returned to the initial position thereof, in other words when it indicates the date indication "1" of the new month, the holding finger 36 has finished pivoting and is once again engaged by the beak 38 thereof with the wolf teeth toothing 32 of the fixed display wheel 30. This movement is assisted by the cooperation between the holding finger 36 and the jumper 34. Indeed, by carefully observing FIGS. 8A, 8C and 8E, it is seen that the first pin 44 borne by the holding finger 36 progressively changes contact plane with the jumper 34. Indeed, in FIG. 8A, the holding finger 36 is butting against the jumper 34 via the first pin 44, which ensures the holding finger 36 is held in the disconnected position. In FIG. 8C, this first pin 44 starts to slide under the jumper 34, and in FIG. 8E which corresponds to the situation wherein the retrograde horological display mechanism 1 has returned to the initial position thereof wherein it points to the date indication "1", the first pin 44 has once again passed completely under the jumper 34, which enables the latter to press the beak 38 of the holding finger 36 elastically into the wolf teeth toothing 32.

It is obvious that the present invention is not limited to the embodiment just described and that various modifications and simple variants can be envisaged by a person skilled in the art without leaving the scope of the invention as defined by the appended claims.

It will be noted in particular that, contrary to what the figures might suggest, the drive wheel 60 is not engaged with the second pinion 22 which forms the second mobile 24 with the second setting-wheel 10.

It will also be understood that, depending on the portion of the profile of the cam 64 against which the feeler-spindle 70 presses via the following beak 72 thereof, this has an impact on the position of this feeler-spindle 70 and therefore on the position of the support surfaces 70*a*, 70*b*, 70*c* and 70*d*. Thus, if the following beak 72 of the feeler-spindle 70 is pressing on the portion of the profile of the cam 64 corresponding to a month with 30 days, the feeler-spindle 70 is arranged to be located in a position wherein the second foot 58 of the display disconnection lever 48 will abut against the second support surface 70*b* one day earlier than when this second foot 58 abuts against the first support surface 70*a* corresponding to a month with 31 days. Consequently, the elastic tension will relax and the retrograde horological display mechanism 1 will be reset one day earlier than in the case where the second foot 58 abuts against the first support surface 70*a*.

It will also be understood that, in the example described above, the support surfaces 70*a*, 70*b*, 70*c* and 70*d* are four in number and correspond respectively to the months with 31 days, the months with 30 days and the month of February which, depending on the case, can have 29 days or 28 days. Consequently, these four support surfaces 70*a*, 70*b*, 70*c* and 70*d* make it possible to provide a perpetual date type retrograde horological display mechanism 1. It is nonetheless obvious that these support surfaces could only be two in number, namely a first support surface for the months with 31 days and a second support surface for the months with 30 days, which would make it possible to provide a conventional annual date type retrograde horological display mechanism 1 wherein the change of date from 28 February to 1 March is not performed automatically.

A simplified embodiment of the dragging type retrograde horological display mechanism according to the invention is illustrated in FIGS. 14 to 38. Designated as a whole by the general reference number 80, this dragging type retrograde horological display mechanism is represented in the simplified embodiment thereof in a top view in FIG. 14 and in a bottom view in FIG. 15. For the purposes of the following description, it will be assumed that this retrograde horological display mechanism 1 is a simple date display mechanism arranged to display in a retrograde manner the date indications from "1" to "31".

Figure 14:
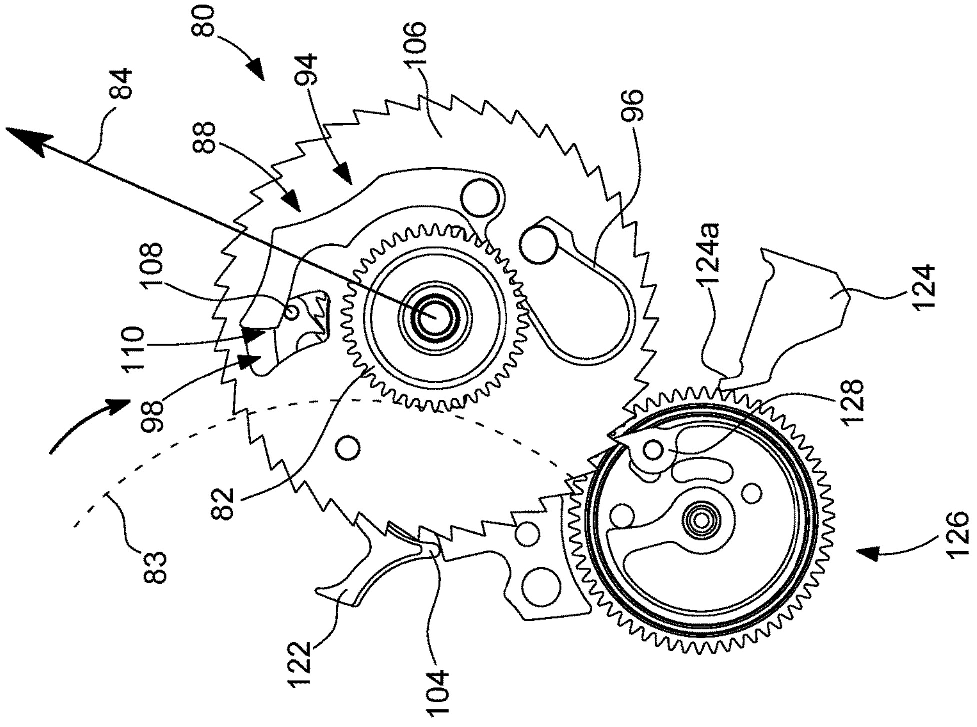
FIGS. 14 and 15 are top and bottom views, respectively, of the dragging type retrograde horological display mechanism according to the invention in the situation wherein it displays the first date indication of the month.
Figure 15:
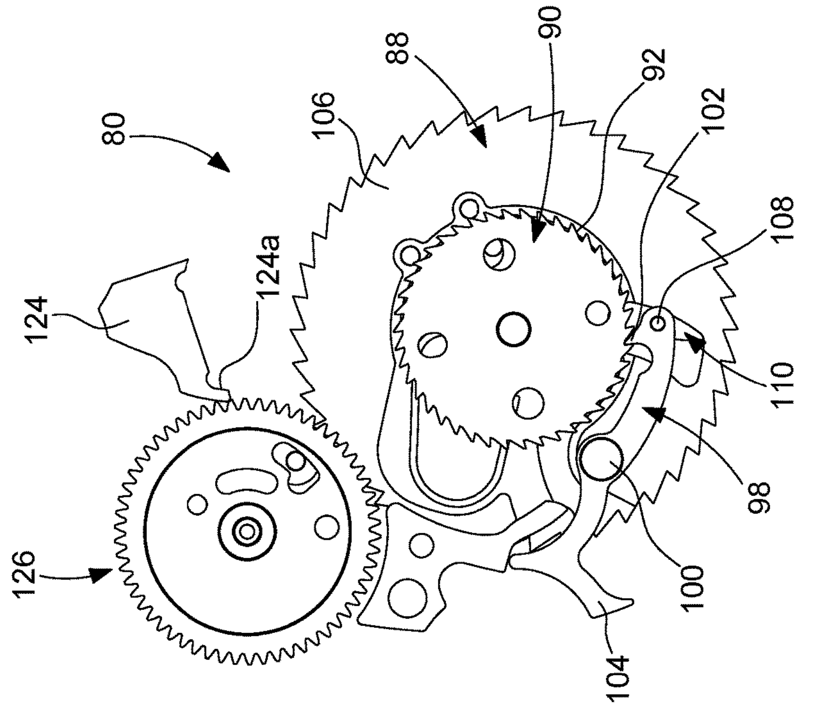

As seen in FIG. 14, the retrograde horological display mechanism 80 comprises a display pinion 82. This display pinion 82 is constrained in rotation in the anti-clockwise direction by a mechanical tension induced by a return element 83 such as a return rack. A display hand 84 moves in the clockwise direction opposite an index 86 featuring the date indications from "1" to "31" (see FIG. 38).

The retrograde horological display mechanism 80 is supplemented by a display wheel 88 whereon the display pinion 82 is freely mounted and with which it is coupled coaxially. The retrograde horological display mechanism 80 further comprises a fixed display wheel 90 provided with a toothing 92 preferably of the wolf teeth type. This fixed display wheel 90 is fixedly mounted on a bridge of a plate of the timepiece movement (not shown) concentrically with the display pinion 82 and with the display wheel 88.

Figure 39:
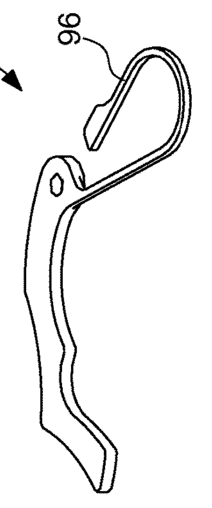
FIG. 39 represents a perspective view of the jumper.
Figure 40:
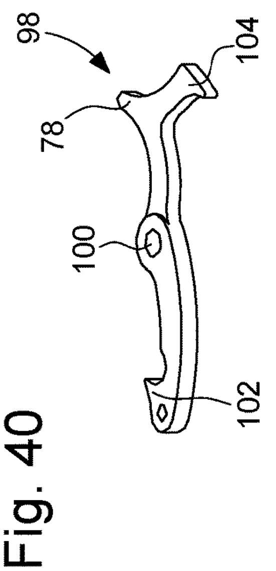
FIG. 40 is a perspective view of the holding fingerpiece.
Figure 41:
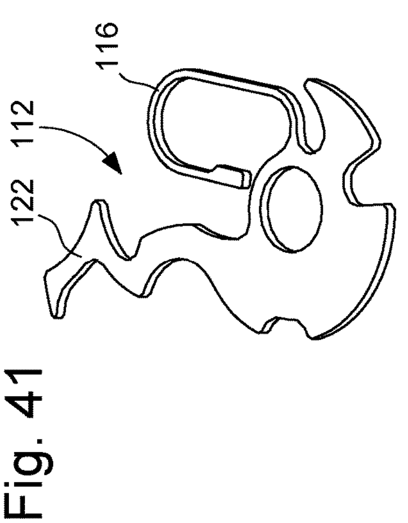
FIG. 41 illustrates a perspective view of the display disconnection lever.

A jumper 94 equipped with an elastic strip 96 is particularly illustrated in FIG. 39. This jumper 94 is borne by the display wheel 88 and presses a holding element preferably such as a holding finger 98 into the toothing 92 of the fixed display wheel 90. This holding finger 98, borne by the display wheel 88, is pivotally mounted about a pivot axis 100 and is equipped with a beak 102 by which it is engaged in the toothing 92 of the fixed display wheel 90. Therefore, it is this holding finger 98 which continuously holds the retrograde horological display mechanism 80 counter to the mechanical tension to which the display pinion 82 is subjected. This holding finger 98 also comprises (see FIG. 40) a first foot 104 the role whereof will be detailed hereinafter. In other words, the toothing 92 makes it possible to retain the elastic tension which is exerted on the display pinion 82 in the anti-clockwise direction and enables the display wheel 88 to move forward by one step in the clockwise direction when moving from one date indication to the next date indication (FIGS. 16 to 21).

The jumper 94 and the holding finger 98 are arranged on either side of a plate 106 of the display wheel 88. The jumper 94 acts upon the holding finger 98 for example via a first pin 108 carried by the holding finger 98 and which protrudes through an opening 110 provided in the plate 106 of the display wheel 88 (see FIG. 42).

Given that preferably but not restrictively, the teeth of the toothing 92 have an inclined wolf teeth profile to enable the holding finger 98 to move from a space between two wolf teeth to the next space, the retrograde horological display mechanism 80 must enable this holding finger 98 to go slightly beyond the space between the two wolf teeth wherein it is to fall before being able to subsequently return slightly to the rear and fall in this space. For this reason, when moving from one date indication to the next date indication, the display hand 84 somewhat exceeds the date indication to which it is to point before being properly positioned opposite this date indication. During the month, this does not pose particular problems as the movement made by the display hand 84 beyond the date indication to which it is to point is brief and almost imperceptible by the owner of the timepiece. This overstepping is on the other hand more problematic when moving from the date indication "31" to the date indication "1". Indeed, as it consists of a dragging type retrograde horological display mechanism 80, the period during which the retrograde horological display mechanism 80 is in a situation which enables the retrograde return thereof from the end position thereof corresponding to the date indication "31" to the initial position thereof corresponding to the date indication "1" lasts a few hours. Consequently, during this period, the display hand 84 gives an incorrect indication, which can lead the owner of the timepiece to believe that the timepiece is suffering from a design defect or indeed is subject to a malfunction, and results in any case in the owner having a poor image of their timepiece. To remedy this problem, the present invention provides for equipping the retrograde horological display mechanism with a disconnection device which will not be described.

Figure 42:
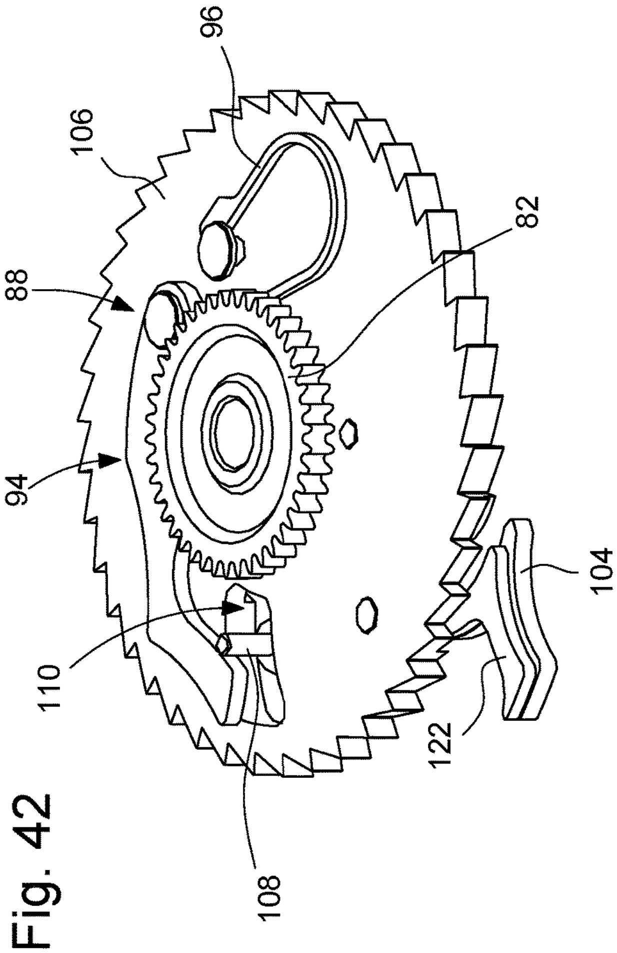
FIG. 42 is a top view of the assembled display wheel.
Figure 43:
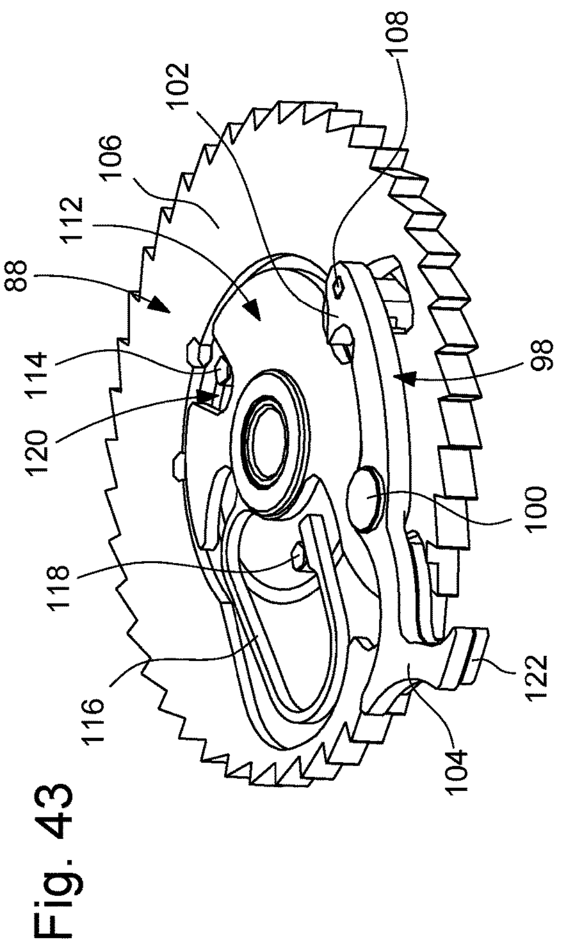
FIG. 43 is a bottom view of the assembled display wheel.

Referring more particularly to FIG. 42 which is a top view of the assembled display wheel 88 and to FIG. 43 which is a bottom view of this same display wheel 88 from which the fixed display wheel 90 has been removed, it is seen that the disconnection device firstly comprises a display disconnection lever 112 which is rigidly connected to the display pinion 82, for example by driving. Moreover, the display disconnection lever 112 is coupled in rotation with the display wheel 88 by means of a second pin 114 fastened in the plate 106 of this display wheel 88. As seen particularly in FIG. 43, the display disconnection lever 112 also comprises an elastic strip 116 in elastic support against a third pin 118 fastened in the plate 106 of the display wheel 88. The second pin 114 protrudes into an opening 120 provided in the display disconnection lever 112. Finally, the display disconnection lever 112 comprises a second foot 122 the role whereof will be detailed in the following description.

As illustrated in FIGS. 16 to 21, once per day, some time before midnight (typically of the order of an hour to an hour and a half before the day changes), the retrograde horological display mechanism 80 starts to move from one date indication to the next date indication. For this driving to be possible, the display wheel 88 is driven by one step per day by the timepiece movement in the clockwise direction. During this driving, the holding finger 98 moves from a space between two successive teeth of the wolf teeth toothing 92 of the fixed display mechanism 90 to the immediately next space, thus ensuring the maintenance under elastic tension of the overall retrograde horological display mechanism 80. For this driving to be possible, it is seen particularly in FIGS. 16, 18 and 20 that a drive wheel 126, driven in a manner known per se by the timepiece movement at a rate of one full revolution in twenty-four hours, drives therewith a drive finger 128 which, in turn, drives the display wheel 88 one step in the clockwise direction. During this driving, the holding finger 98 moves from a space between two successive teeth of the wolf teeth toothing 92 of the fixed display mechanism 90 to the immediately next space, thus ensuring the maintenance under elastic tension of the overall retrograde horological display mechanism 1. Advantageously, the drive finger 128 is elastic, such that it can move away in front of the teeth of the display wheel 88 when the latter turns in the retrograde direction when the retrograde horological display mechanism 80 returns to the initial position thereof. A further advantage offered by the drive finger 128 is that, due to the elasticity thereof, it enables the owner of the timepiece to perform hand-setting in the anti-clockwise direction without the retrograde horological display mechanism 80 being driven and therefore put out of order.

The display disconnection lever 112 is rigidly connected to the display pinion 82 and, via the second pin 114, is coupled in rotation with the display wheel 88 which is free in rotation relative to the fixed display wheel 90. Consequently, the display pinion 82 which is freely mounted coaxially on the display wheel 88 pivots in turn and drives the display hand 84, such that the display can move from one date indication to the next date indication. Similarly, the third pin 118 comes into contact with the elastic strip 116 of the display disconnection lever 112 and drives the latter in rotation.

Driven by the timepiece movement, the display wheel 88 therefore drives the holding finger 98 which is carried by the display wheel 88 over 11.1°, while the angle which separates two consecutive teeth of the wolf teeth toothing 92 of the fixed display wheel 90 is merely 8.57°. It is therefore understood that the holding finger 98 moves forward more than necessary, in order to ensure that it moves correctly from a space between two consecutive teeth of the wolf teeth toothing 92 to the immediately next space, and therefore that the information displayed is incremented correctly. It should nonetheless be understood that this embodiment must not be interpreted in a restrictive manner particularly with respect to the angle values which are dependent on the dimensioning of the retrograde horological display mechanism 80.

It is also understood that the example of the display of the date indications from "1" to "31" is also given merely by way of illustration and not mere restriction, and that other time indications can be displayed by the retrograde horological display mechanism 80 according to the invention, such that the number of steps performed by the display wheel 88 between two successive returns to the display of the first date indication can be different from thirty and one. For example, if the retrograde horological display mechanism 80 according to the invention is used to display the days of the week, the display wheel 88 will move six steps forward between two successive returns to the display of the indication of the day "Monday". Or the display wheel 88 will move forward by one step per month if the display mechanism according to the invention is intended to display the months of the year.

In the case of interest here, namely the application of a retrograde horological display mechanism 1 according to the invention to a simple date display, this retrograde horological display mechanism 80 is finally supplemented by a fixed period limiting element 124 which is equipped with a single support surface 124*a* which corresponds to the duration of a month with 31 days.

Figure 22:
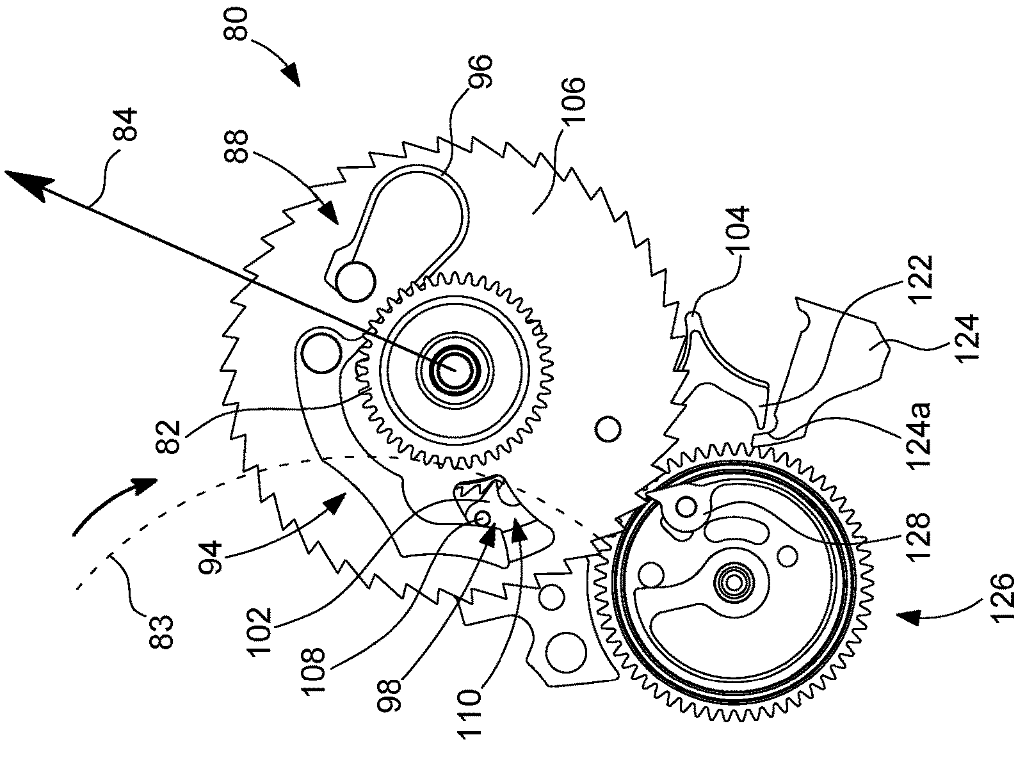
FIGS. 22 and 23 illustrate, in a top and bottom view respectively, the position of the retrograde horological display mechanism when the holding fingerpiece and the display disconnection lever are facing the support surface of the period limiting element by the respective feet thereof.
Figure 23:
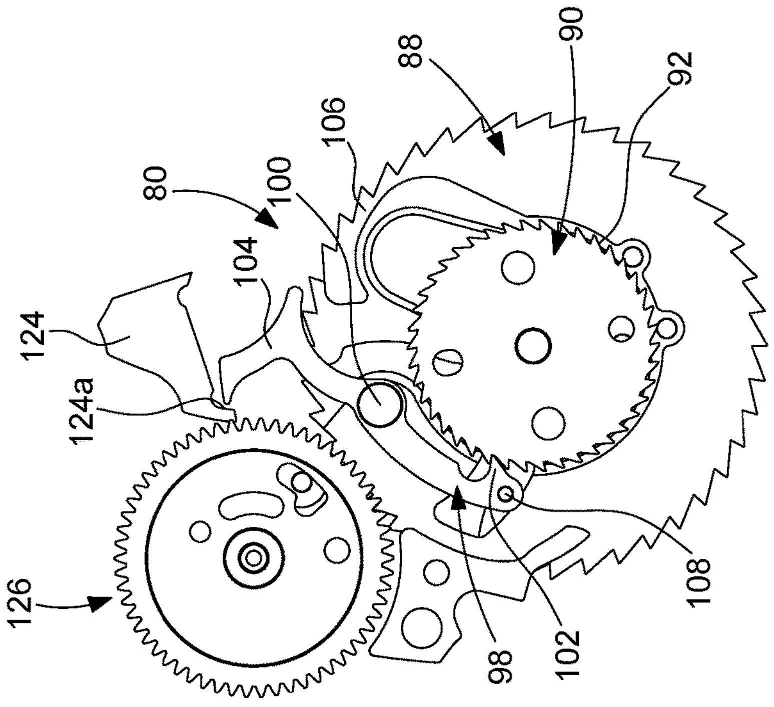
Figure 25:
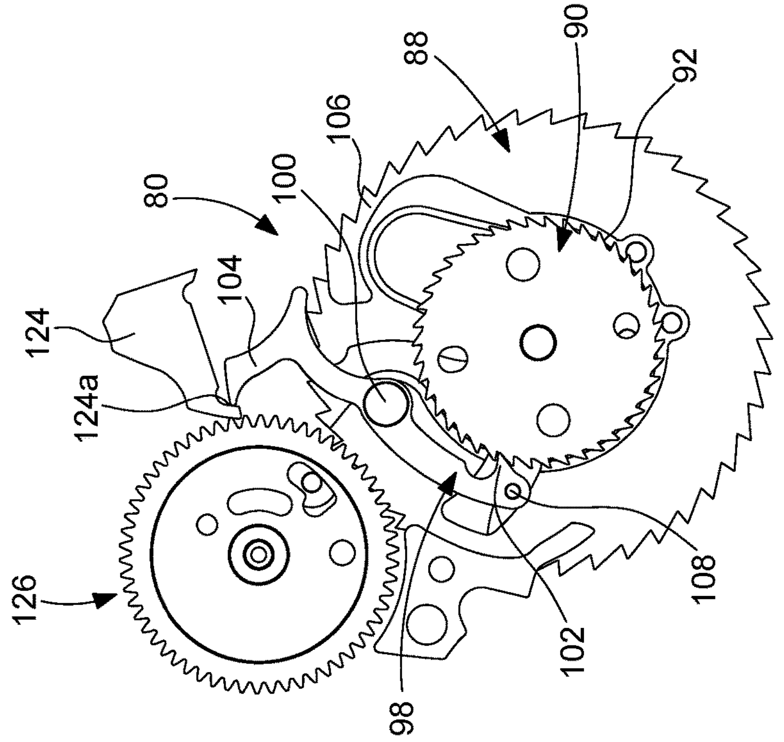
FIGS. 24 and 25 illustrate, in a top and bottom view respectively, the position of the retrograde horological display mechanism when the holding fingerpiece and the display disconnection lever abut against the support surface of the period limiting element.
Figure 27:
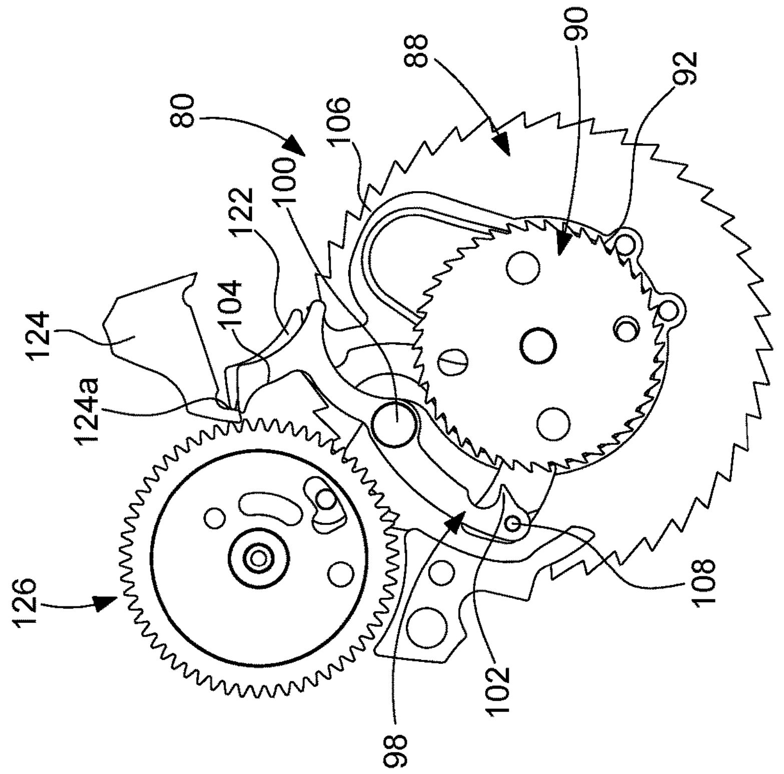
FIGS. 26 and 27 illustrate, in a top and bottom view respectively, the position of the retrograde horological display mechanism when the holding fingerpiece is released from the toothing of the fixed display wheel.
Figure 26:
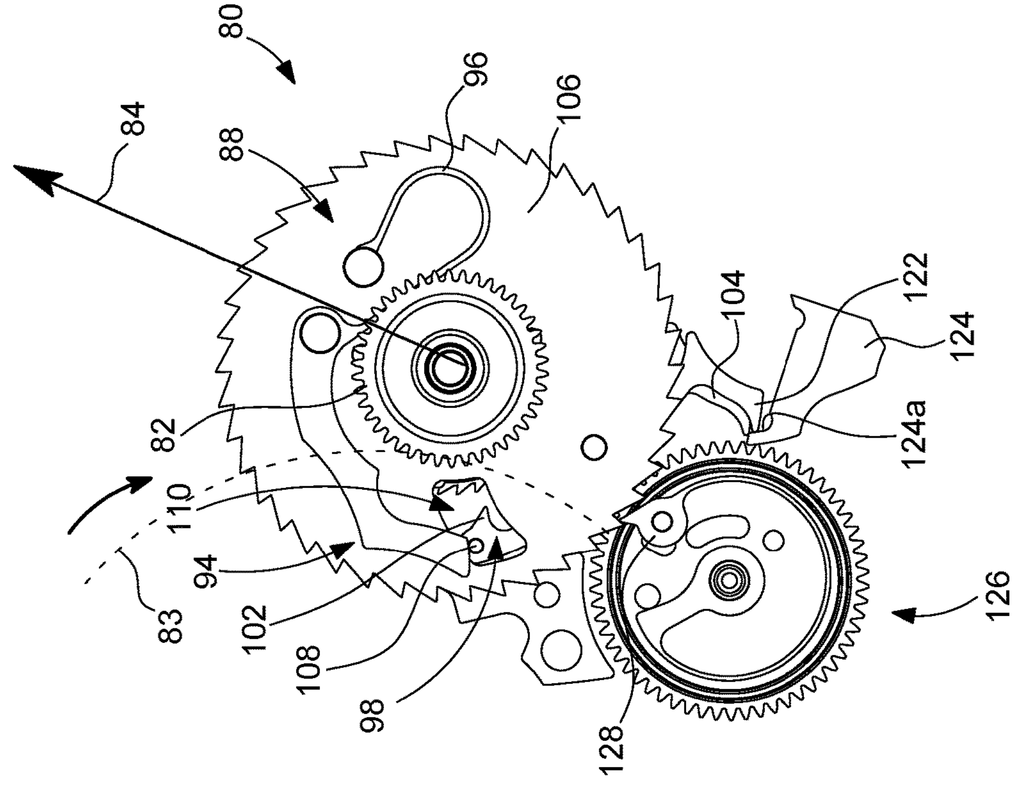
Figure 28:
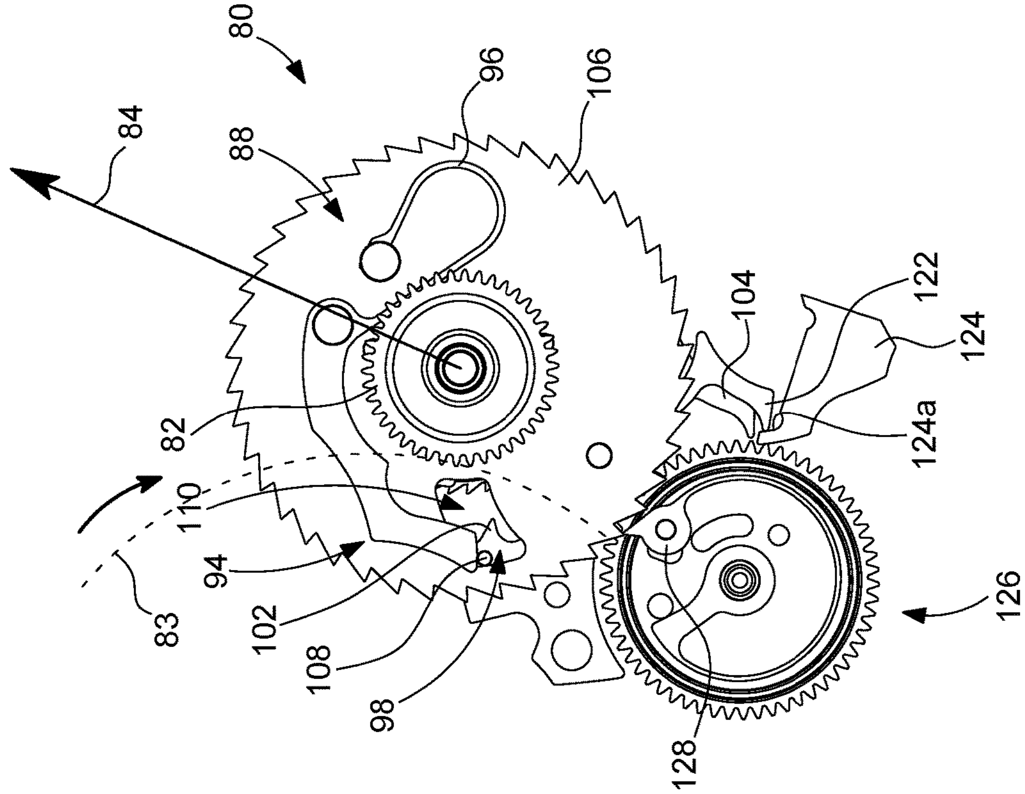
FIGS. 28 and 29 illustrate, in a top and bottom view respectively, the position of the retrograde horological display mechanism at the end of the driving of the display wheel.
Figure 29:
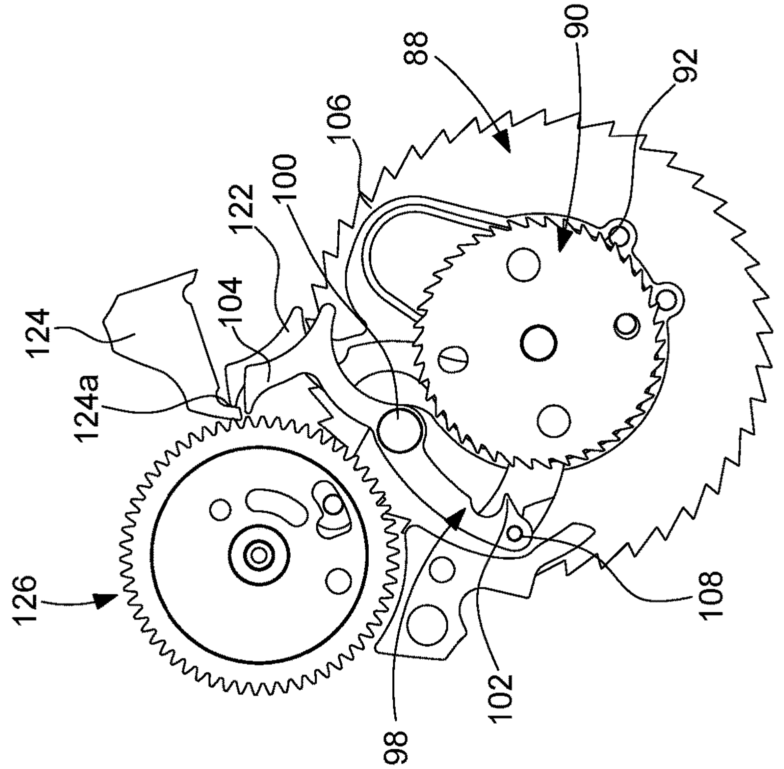
Figure 31:
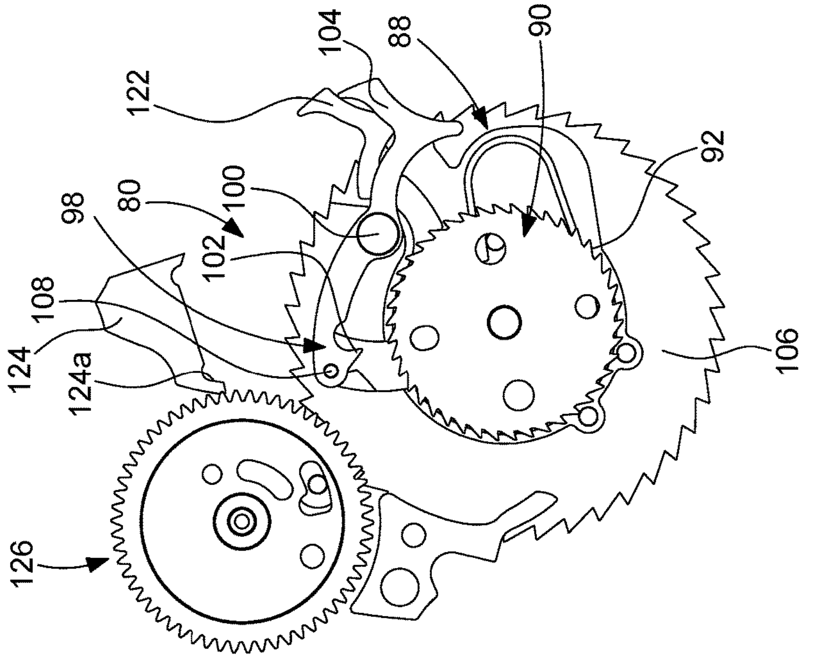
FIGS. 30 and 31 illustrate, in a top and bottom view respectively, the position of the retrograde horological display mechanism when the retaining force exerted by the elastic strip of the display disconnection lever is released and the display wheel will instantaneously rotate in the anti-clockwise direction.
Figure 30:
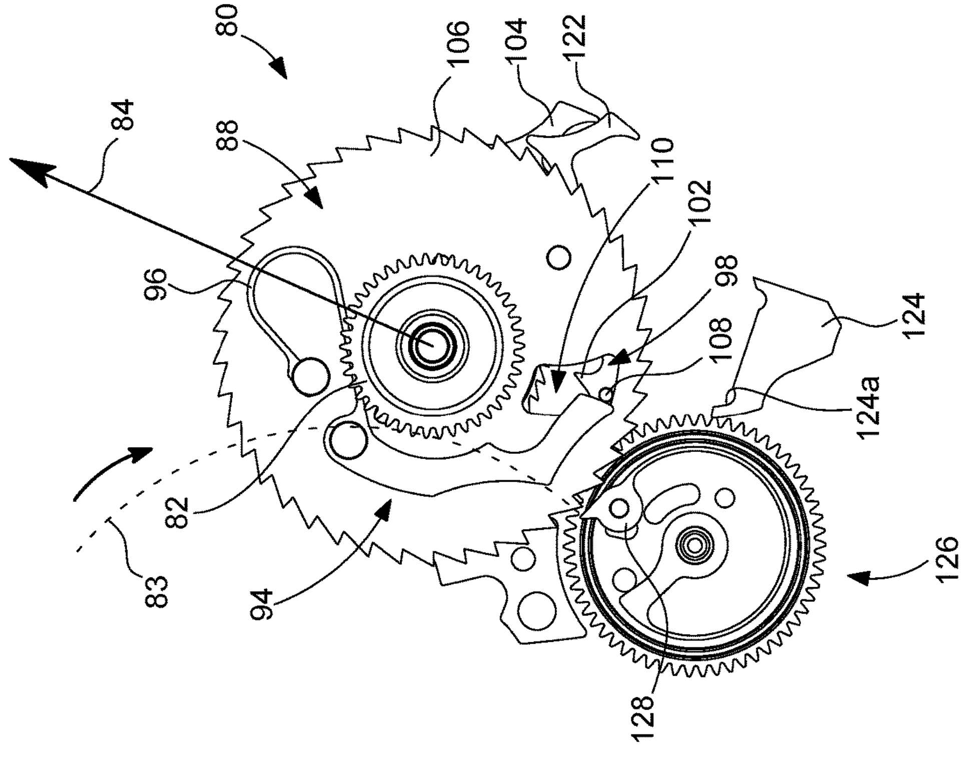

In the example illustrated in the figures appended to the present patent application, the retrograde horological display mechanism 80 according to the invention is in a situation corresponding to the display of the date indications of a month with 31 days. Thus, as seen in FIGS. 22 and 23, when the retrograde horological display mechanism 80 displays the date indication "31", the holding finger 98 and the display disconnection lever 112 are facing the support surface 70*a* of the period limiting element 124 via the respective feet 104 and 122 thereof. Then, when the retrograde horological display mechanism 80 is getting ready to go back to the date indication "1", the feet 104 and 122 of the holding finger 98 and the display disconnection lever 112 abut against the support surface 124*a* of the period limiting element 124 (see FIGS. 24 and 25). In this position, the retrograde horological display mechanism 80 is not yet disconnected. Indeed, during the time period which separates the transition of the display from the date indication "31" to the date indication "1", the display wheel 88 is pivoting. While pivoting, this display wheel 88 drives therewith by the second pin 114 the display disconnection lever 112 which, in turn, drives the display pinion 82. Then (FIGS. 26 to 31), the display disconnection lever 112 abuts by the foot 122 thereof against the support surface 124*a* of the period limiting element 124 and remains locked (see FIGS. 26 and 27). As for the holding finger 98, driven by the display wheel 88, it abuts by the foot 104 thereof against the same support surface 124*a* of the period limiting element 124, which forces this holding finger 98 to pivot about the pivoting axis 100 thereof. While pivoting, the holding finger 98 will thus go against the elastic force of the jumper 94 and will be capable of being released from the wolf teeth toothing 92 of the fixed display wheel 90. The display disconnection lever 112 being blocked, the elastic strip 116 is, under the effect of the pivoting of the display wheel 88, driven by the third pin 118 and is tensioned. Finally, as also seen in FIGS. 26 and 27, when the holding finger 98 is released from the wolf teeth toothing 92 of the fixed display wheel 90, the holding force exerted by the elastic strip 116 of the display disconnection lever 112 is released.

The display of the date indication is linked with the display disconnection lever 112; indeed, the display wheel 88 itself drives the display disconnection lever 112. This display disconnection lever 112, driven on the display pinion 82, induces the pivoting thereof. Consequently, as the display disconnection lever 112 is immobile during the period corresponding to the transition from the date indication "31" to the date indication "1", the date indication will not change during this period. At the end of the driving of the display wheel 88 (see FIGS. 28 and 29), the retaining force exerted by the elastic strip 116 of the display disconnection lever 112 is relaxed and the display wheel 88 will turn instantaneously in the anti-clockwise direction under the effect of the elastic force which is applied to this display wheel 88 via the display disconnection lever 112 and the display pinion 82 (see FIGS. 30 and 31).

Figure 33:
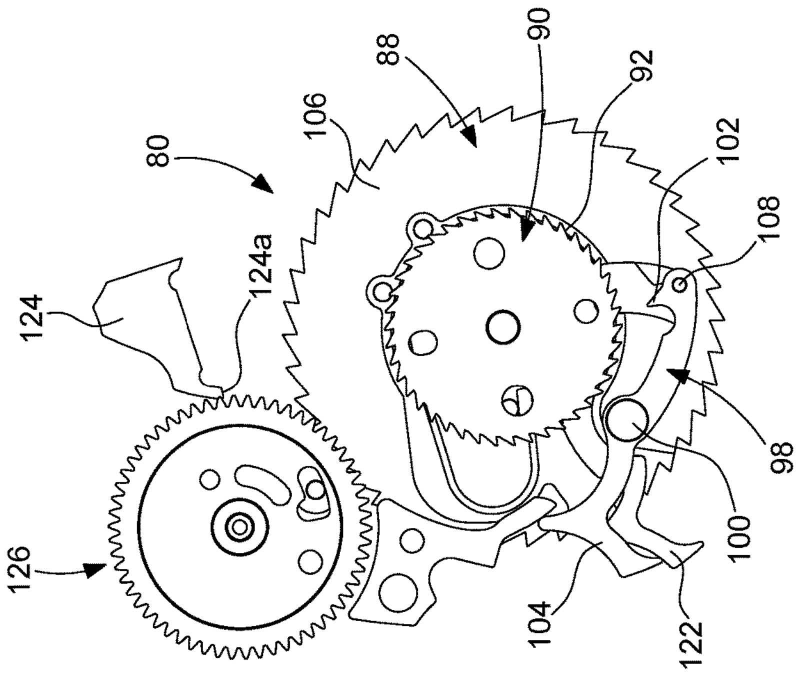
FIGS. 32 and 33 illustrate, in a top and bottom view respectively, the position of the retrograde horological display mechanism when the holding fingerpiece is returned towards the toothing of the fixed display wheel.
Figure 32:
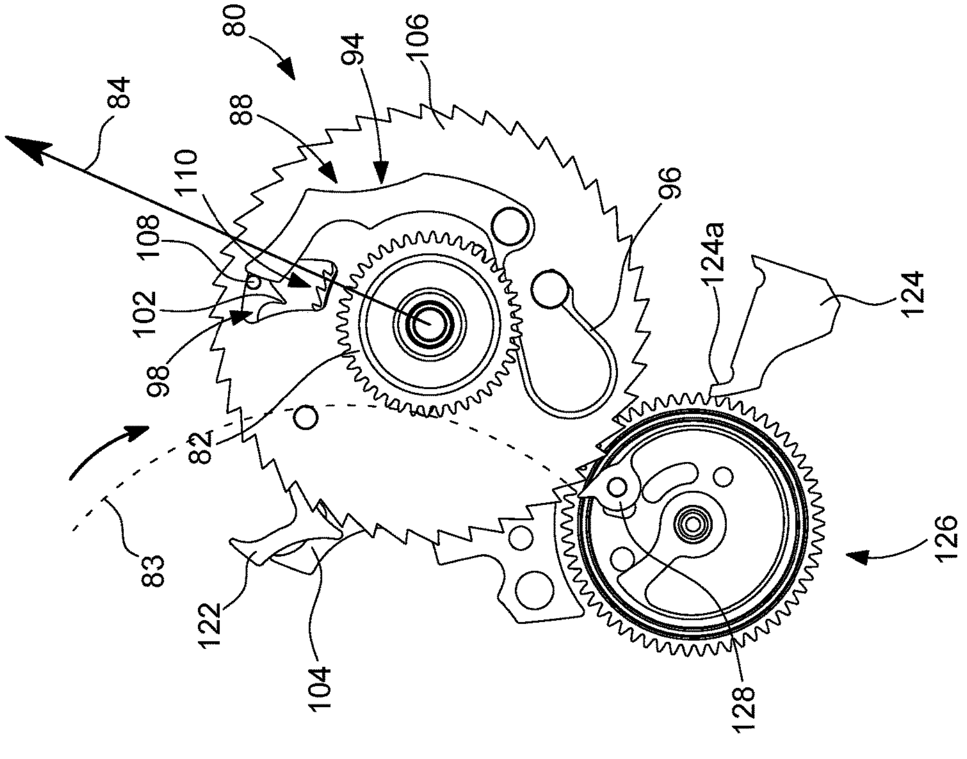
Figure 35:
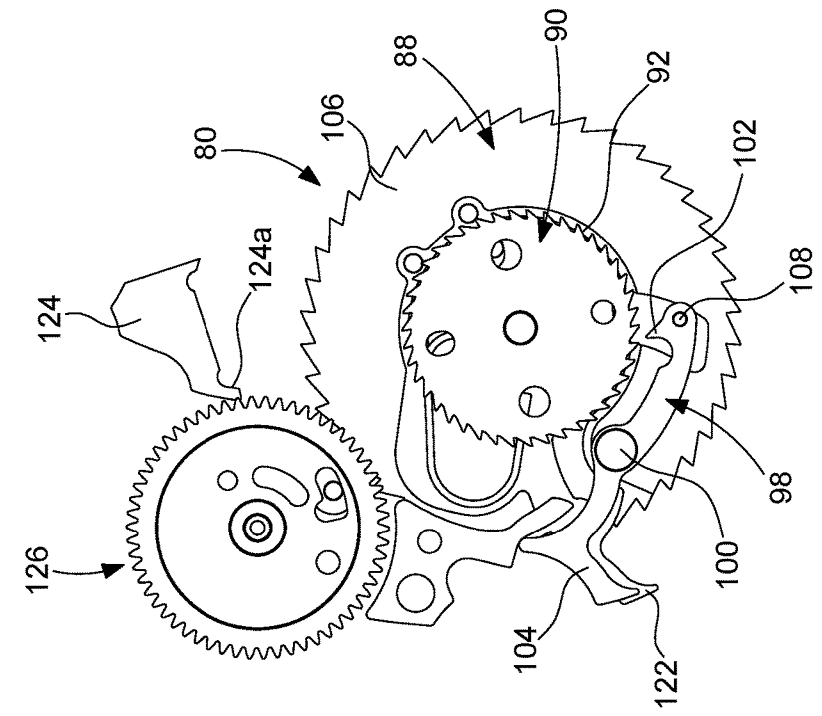
FIGS. 34 and 35 illustrate, in a top and bottom view respectively, the position of the retrograde horological display mechanism when the holding fingerpiece returns once again to be engaged in the teeth of the wolf teeth toothing.
Figure 34:
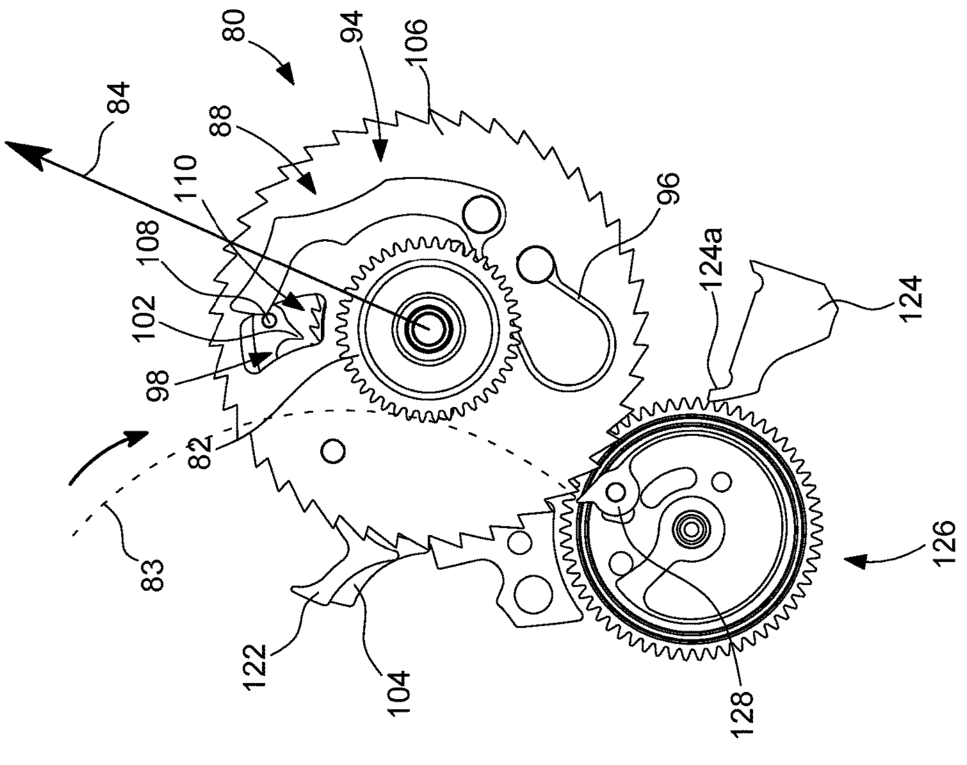
Figure 37:
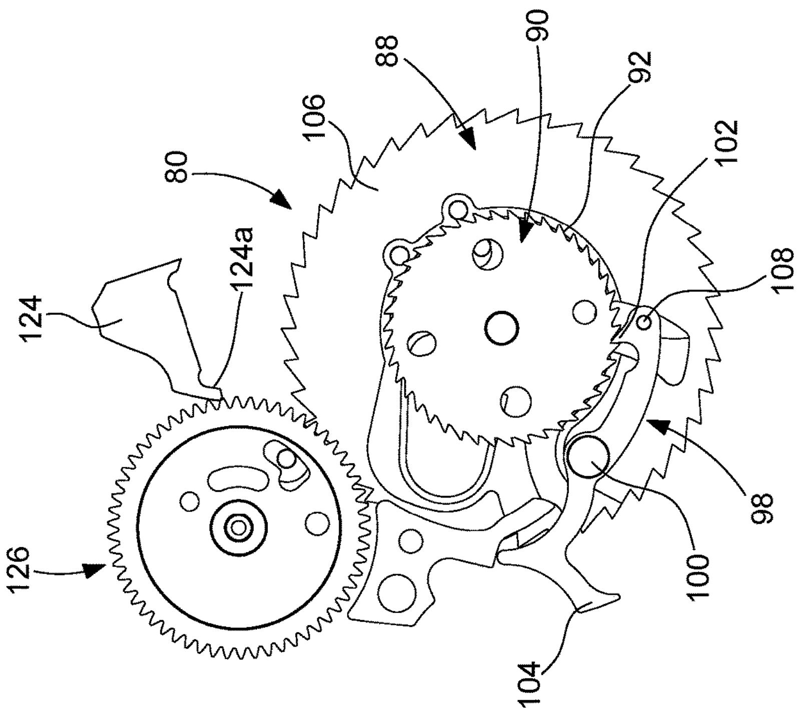
FIGS. 36 and 37 illustrate, in a top and bottom view respectively, the position of the retrograde horological display mechanism wherein it again displays the date indication "1"
Figure 36:
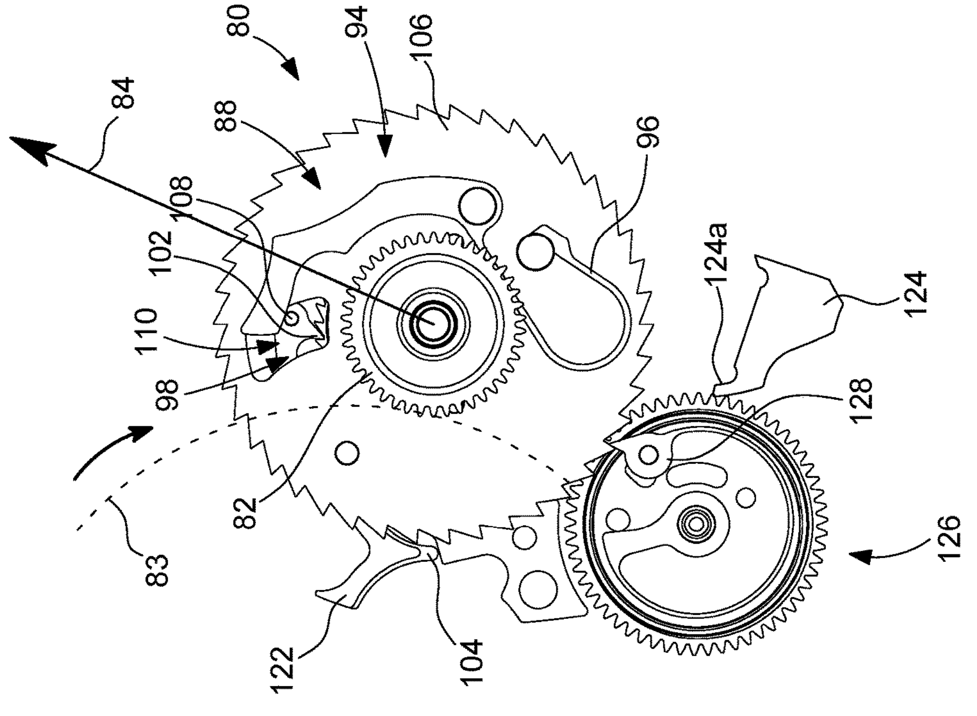
Figure 38:
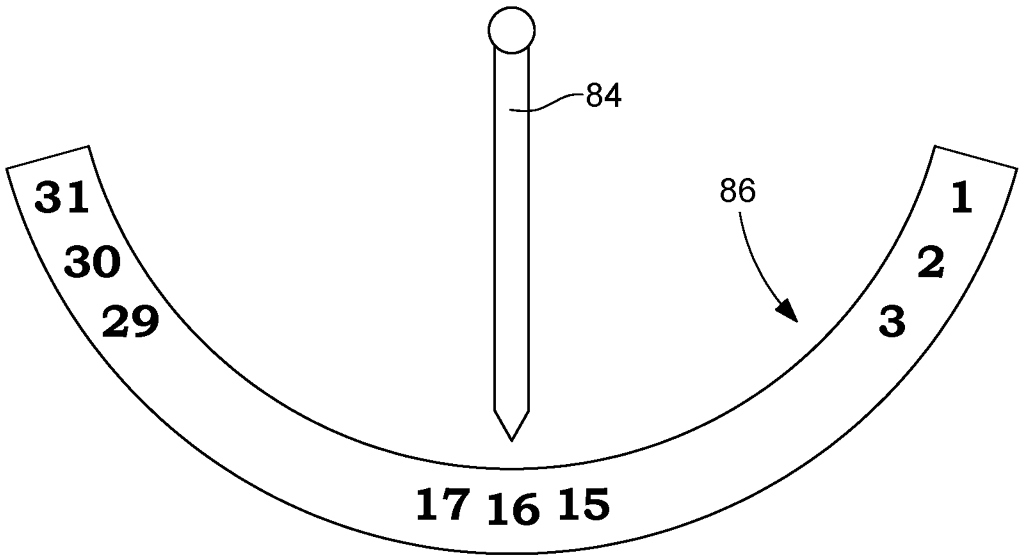
FIG. 38 is a detailed view which illustrates the display hand moving in the clockwise direction in front of an index featuring, for example, the date indications from "1" to "31"

When the display wheel 88 stops turning, a cam or a pin (not shown) will return the holding finger 98 engaged in the wolf teeth toothing 92 of the fixed display wheel 90 (see FIGS. 32 and 33). The retrograde horological display mechanism 80 is then in the position illustrated in FIGS. 34 and 35 wherein it displays the date indication "1" again.

Figure 17:
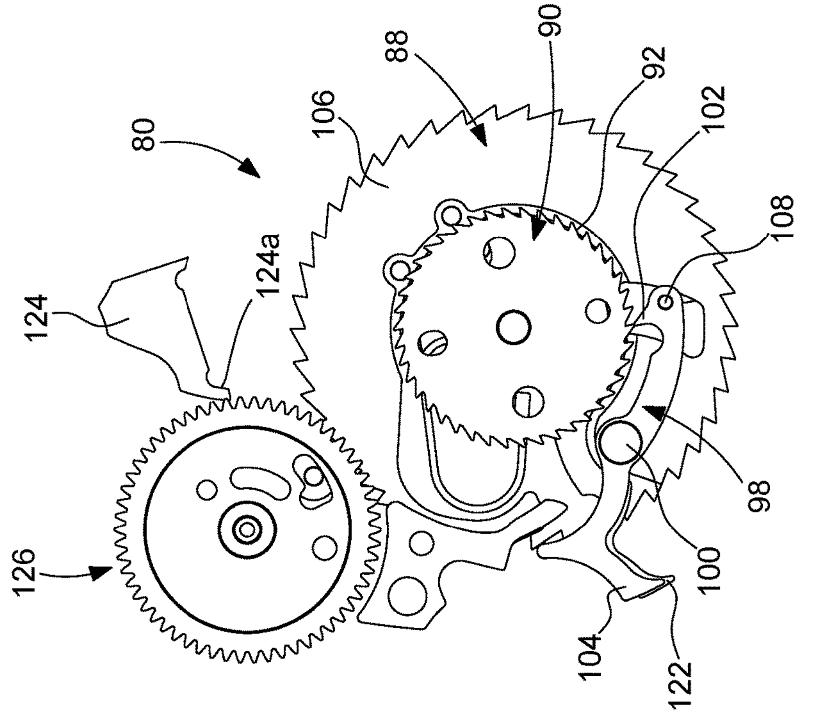
Figure 16:
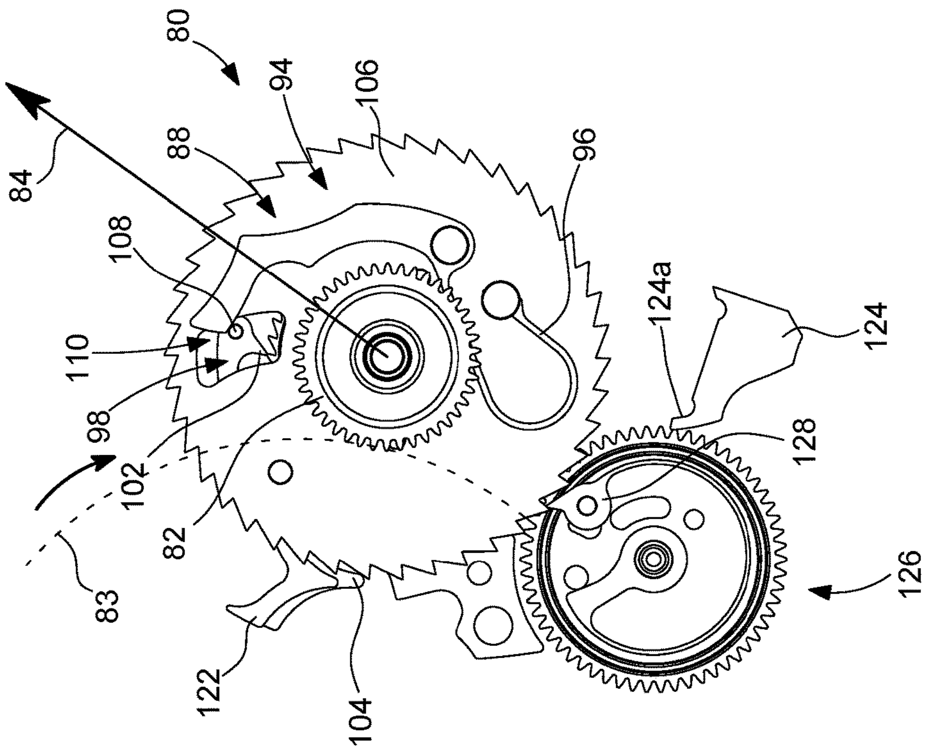
FIGS. 16, 18 and 20 on one hand, and FIGS. 17, 19 and 21 on the other are views which illustrate, from the top and bottom respectively, the transition of the retrograde horological display mechanism between the date indication “1” and the date indication “2”
Figure 19:
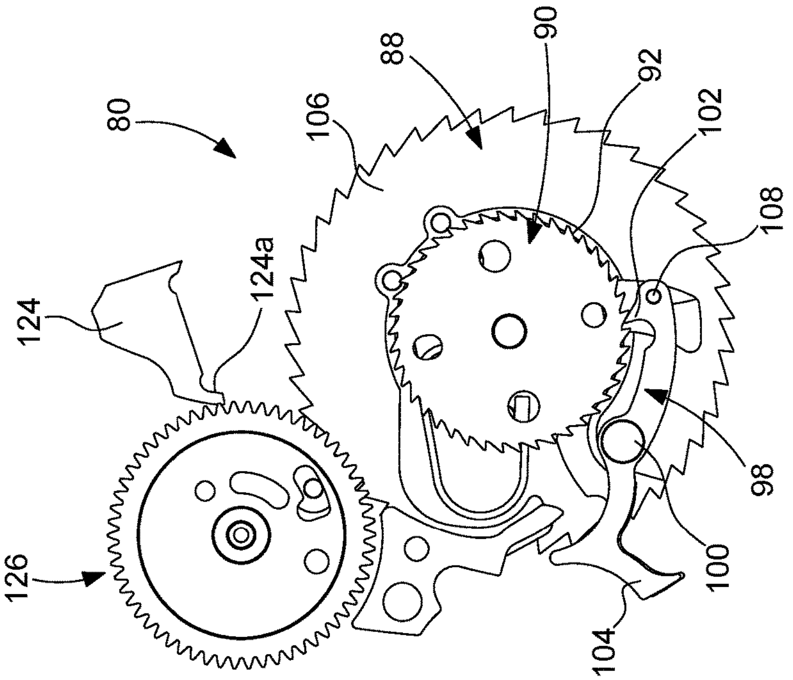
Figure 18:
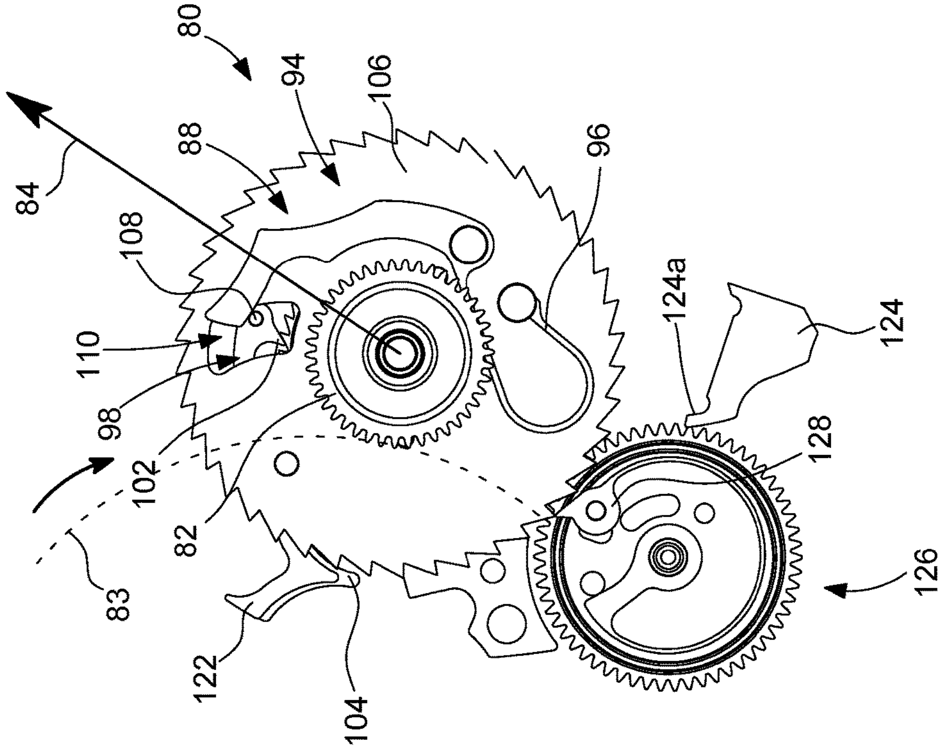
Figure 21:
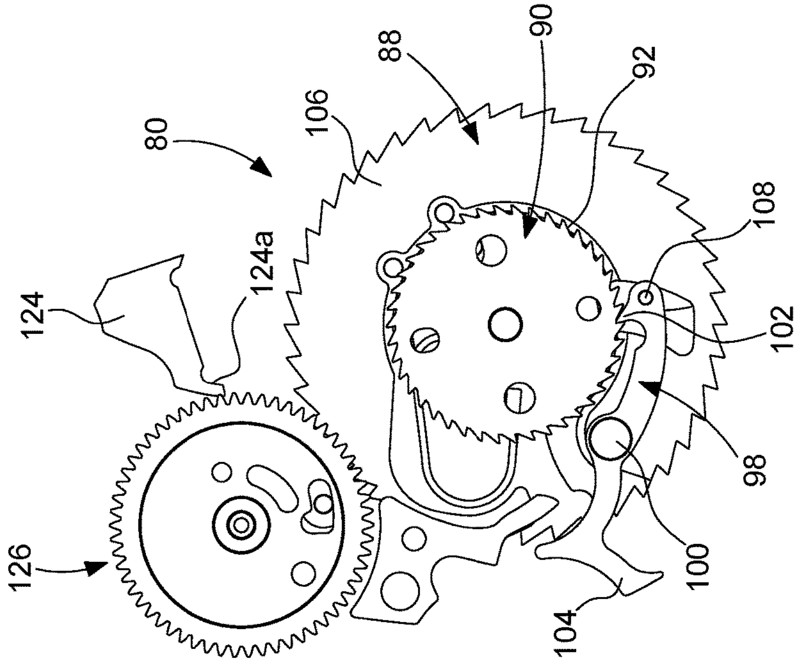
Figure 20:
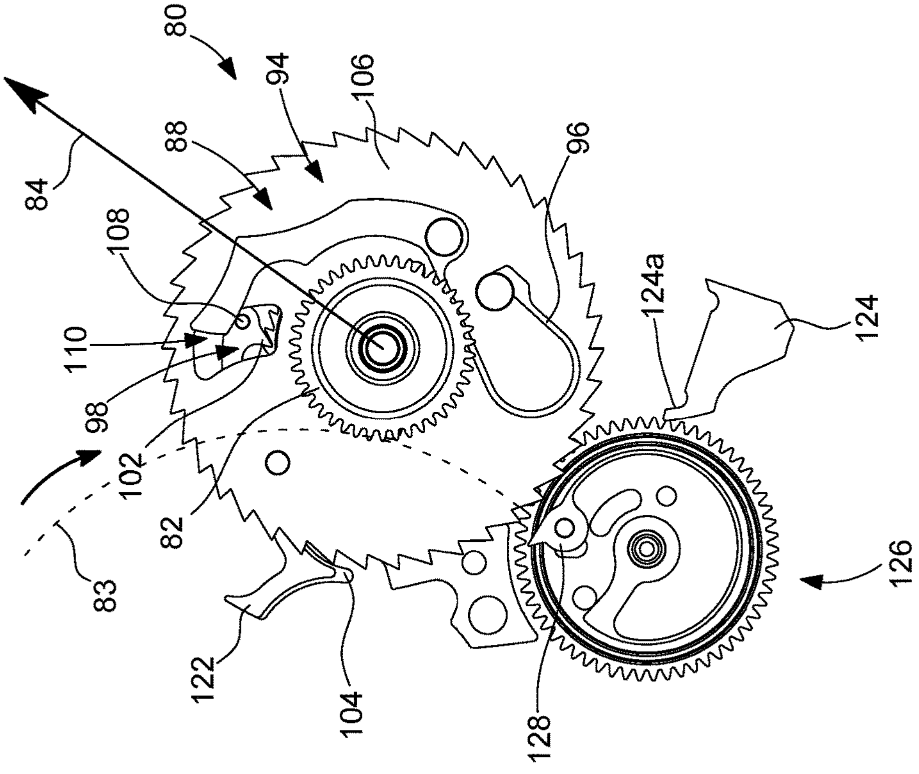

In normal operating mode of the retrograde horological display mechanism 80, the beak 102 of the holding finger 98 is constantly engaged with the teeth of the wolf teeth toothing 92, except when at around midnight, this retrograde horological display mechanism 80 moves from one date indication to the next date indication and the holding finger 98 pivots just by the amount required to enable the beak 102 thereof to move from a space between two teeth of the wolf teeth toothing 92 to the immediately next space (FIGS. 16 and 17). When the retrograde horological display mechanism 80 reaches the date indication "31" and will have to return in a retrograde manner to the date indication "1" (FIGS. 22 and 23), the foot 104 of the holding finger 98 moves away from the support surface 124*a* of the period limiting element 124, such that the holding finger 98 tilts and the beak 102 thereof is released from the engagement thereof with the wolf teeth toothing 92 (FIGS. 26 and 27). At that time, the holding in position of the retrograde horological display mechanism 80 is no longer guaranteed and this mechanism will seek to return in a retrograde manner to the date indication "1" (FIGS. 30 and 31), then the beak 102 of the holding finger 98 will return again to engage in the teeth of the wolf teeth toothing 92, which will ensure again the holding in position of the retrograde horological display mechanism 1 (FIGS. 32 and 33).

Figure 24:
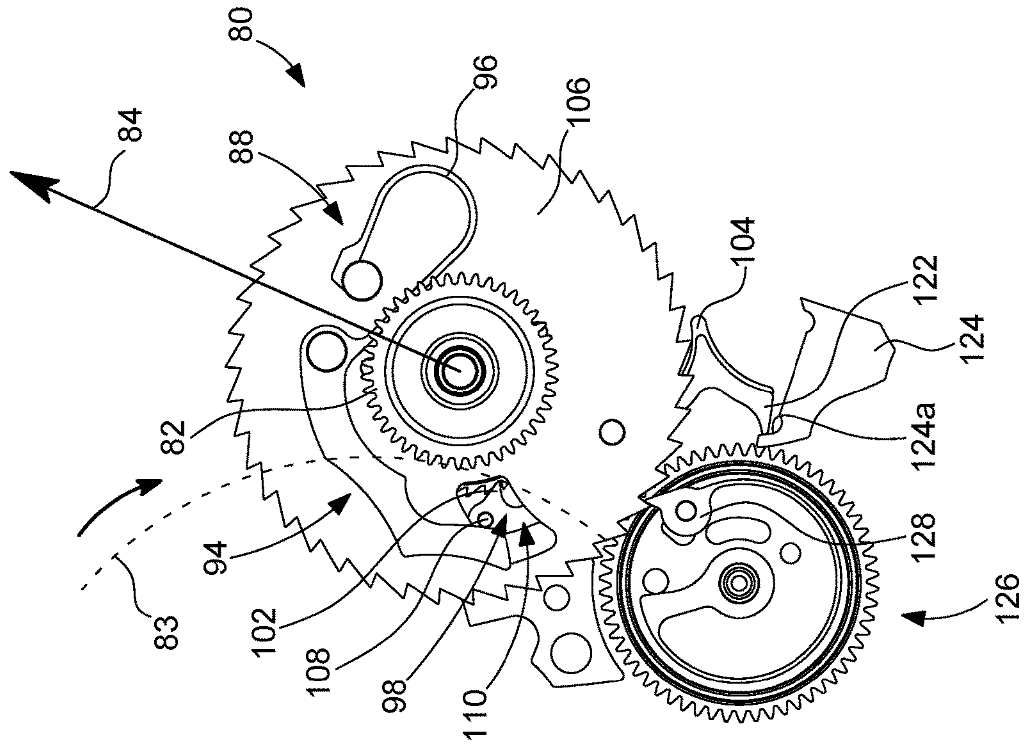

More specifically, FIGS. 24 to 31 illustrate the operation of the retrograde horological display mechanism 80 at the exact time when the latter moves in a retrograde manner from the date indication "31" to the date indication "1". This movement is assisted by the cooperation between the holding finger 98 and the jumper 94. Indeed, by carefully observing FIGS. 26, 28, 30, 32, 34 and 36, it is seen that the first pin 108 carried by the holding finger 98 progressively changes contact plane with the jumper 94. In FIG. 24, this first pin 108 starts to slide under the jumper 94, and in FIG. 36 which corresponds to the situation wherein the retrograde horological display mechanism 80 has returned to the initial position thereof wherein it points to the date indication "1", the first pin 108 has once again passed completely under the jumper 94, which enables the latter to press the beak 102 of the holding finger 98 elastically into the wolf teeth toothing 92.

It is obvious that the present invention is not limited to the embodiments just described and that various modifications and simple variants can be envisaged by a person skilled in the art without leaving the scope of the invention as defined by the appended claims.

LIST OF REFERENCE SIGNS

1. Retrograde horological display mechanism
2. Return rack
4. Return spring
6.Geartrain
8. First setting-wheel
10. Second setting-wheel
12. Third setting-wheel
14. Display pinion
16. Toothed sector
18. First pinion
20. First mobile
22. Second pinion
23. Display hand
24. Second mobile
26. Index
28. Display wheel
30. Fixed display wheel
32. Toothing
34. Jumper
35. Elastic strip
36. Holding finger
37. Pivoting axis
38. Beak
40. First foot
42. Plate
44. First pin
46. Opening
48. Display disconnection lever
50. Second pin
52. Opening
54. Elastic strip
56. Third pin
58. Second foot
60. Drive wheel
62. Drive finger
64. Cam
66. Starwheel

68. Second drive finger
70. Feeler-spindle
70*a*, 70*b*, 70*c* and 70*d*. Support surfaces
72. Following beak
74. Repositioning cam
76. Nose
78. Counterpart appendage
80. Retrograde horological display mechanism
82. Display pinion
83. Return element
84. Display hand
86. Index
88. Display wheel
100. Pivoting axis
102. Beak
104. First foot
106. Plate
108. First pin
110. Opening
112. Display disconnection lever
114. Second pin
116. Elastic strip
118. Third pin
120. Opening
122. Second foot
124. Period limiting element
124*a*. Support surface
126. Drive wheel
128. Drive finger

The invention claimed is:

1. A dragging type retrograde horological display mechanism driven by a movement of a timepiece wherein said retrograde horological display mechanism is embedded, said retrograde horological display mechanism being arranged to display at least one first and at least one last distinct indication, the dragging type retrograde horological display mechanism comprising:

a display wheel;

a display pinion and a fixed display wheel arranged on either side of the display wheel, the display pinion being freely mounted on the display wheel coaxially, and the fixed display wheel being fixedly mounted concentrically to the display wheel and the display pinion and being provided with a toothing;

a pivoting holding element engaged in the toothing of the fixed display wheel;

a drive wheel moved by the timepiece movement and which drives the display wheel;

a return element which tends to constrain the display pinion in rotation;

a display disconnection lever rigidly connected to the display pinion and coupled in rotation with the display wheel, said display disconnection lever comprising an elastic strip in elastic support against a pin fastened in the display wheel;

the holding element and the display disconnection lever being arranged such that, when the retrograde horological display mechanism moves from the display of the last indication to the display of a next first indication, the holding element pivots, whereas the display disconnection lever is locked, such that the elastic strip becomes strained and that the holding element is forced to be released from the toothing of the fixed display wheel, thus enabling the stress induced in the retrograde horological display mechanism by the return element to relax and return said retrograde horological display mechanism in a retrograde direction to an initial position thereof wherein it displays the next first indication.

2. The retrograde horological display mechanism according to claim 1, wherein, in the case where a duration separating the at least one first displayed indication from the at least one last displayed indication is fixed, the retrograde horological display mechanism comprises a fixed period limiting element provided with a single support surface which determines the duration separating the at least one first indication from the at least one last indication.

3. The retrograde horological display mechanism according to claim 2, wherein the holding element is a finger comprising a first foot and wherein the display disconnection lever comprises a second foot, these first and second feet being arranged such that, when the retrograde horological display mechanism moves from the display of the last indication to the display of the next first indication, these first and second feet are facing the support surface, then, while the drive wheel continues to drive the display wheel, the first foot moves away from the support surface, whereas the second foot abuts against the support surface, which prevents the pivoting of the display disconnection lever and causes the tensioning of the elastic strip, the holding element being forced to pivot, which enables it to be released from the toothing of the fixed display wheel, thus enabling the second foot to be released from the support surface in a retrograde manner and the retrograde horological display mechanism to return to the initial position thereof wherein it displays the next first indication.

4. The retrograde horological display mechanism according to claim 3, wherein the holding finger is pressed elastically into the toothing of the fixed display wheel by a jumper borne by the display wheel.

5. The retrograde horological display mechanism according to claim 2, wherein the drive wheel is equipped with an elastic drive finger by which said drive wheel drives the display wheel.

6. The retrograde horological display mechanism according to claim 2, wherein the return element is a return rack which is constrained elastically, whereby the return rack creates mechanical tension which constrains the display pinion in rotation.

7. The retrograde horological display mechanism according to claim 6, wherein the return rack comprises a second drive finger via which the return rack drives a starwheel fastened on the cam by one step each time the retrograde horological display mechanism moves from the display of the last indication to the display of the next first indication.

8. The retrograde horological display mechanism according to claim 7, wherein, while the retrograde horological display mechanism displays an indication, the second drive finger, borne by the return rack, is progressively retracted and is gradually positioned behind a given tooth of the starwheel, such that when the retrograde horological display mechanism moves from the display of the last indication to the display of the next first indication, the elastic tension in the retrograde horological display mechanism is relaxed and the return rack returns to the initial position thereof by pivoting and by driving therewith the second drive finger which moves the starwheel and therefore the cam forward by one step.

9. The retrograde horological display mechanism according to claim 1, wherein, in the case where a duration which separates the at least one first displayed indication from the at least one last displayed indication is variable, the retrograde horological display mechanism comprises:

a cam arranged to manage at least two durations of different values which separate the at least one first and at least one last indication and which is driven by one step by the return element each time the retrograde horological display mechanism moves from the last indication to the next first indication, and a mobile feeler-spindle pressing against a profile of the cam, the feeler-spindle also comprising at least one first and one second support surfaces determining the two durations of different values which separate the at least one first and one last indication.

10. A retrograde horological display mechanism according to claim 9, wherein the feeler-spindle is equipped with a following beak by which said feeler- spindle presses against the profile of the cam.

* * * * *